United States Patent [19]

Akashi et al.

[11] Patent Number: 5,662,403

[45] Date of Patent: Sep. 2, 1997

[54] LUMINAIRE FOR INTERIOR LIGHTING

[75] Inventors: Yukio Akashi; Yoshinori Tanabe; Izumi Akashi, all of Hirakata; Kenji Mukai, Kobe, all of Japan

[73] Assignee: Matsushita Electric Industrial Co., Ltd., Osaka, Japan

[21] Appl. No.: 513,722

[22] Filed: Aug. 11, 1995

[30] Foreign Application Priority Data

Aug. 12, 1994 [JP] Japan .................. 6-190463
Feb. 9, 1995 [JP] Japan .................. 7-021865

[51] Int. Cl.$^6$ ............................. F21V 7/04
[52] U.S. Cl. .............. 362/32; 362/292; 362/297; 362/342; 362/346
[58] Field of Search ............. 362/32, 84, 290, 362/297, 342, 346, 347, 348, 291, 292

[56] References Cited

U.S. PATENT DOCUMENTS

| | | | |
|---|---|---|---|
| 2,981,827 | 4/1961 | Orsatti et al. | 362/84 |
| 3,124,310 | 3/1964 | Lipscomb | 362/342 |
| 3,710,095 | 1/1973 | Donohue et al. | 362/348 |
| 4,152,752 | 5/1979 | Niemi | 362/32 |
| 4,222,094 | 9/1980 | Wolar | 362/342 |
| 4,931,910 | 6/1990 | Wills | 362/84 |
| 5,136,491 | 8/1992 | Kano | 362/346 |
| 5,335,152 | 8/1994 | Winston | 362/347 |

*Primary Examiner*—Alan Cariaso
*Attorney, Agent, or Firm*—Ratner & Prestia

[57] ABSTRACT

A luminaire used in a room is provided with a brightness effect to avoid giving glare directly to people in the room, to give a desired illuminance on a working surface, and to give a high brightness sensation in the overall room. One or more sparkling regions are provided in which the luminance L (cd/m$^2$) is in a range of $3.3 \leq \log L \leq -0.3 \log w + 2.63$, when seen from any position in the room between a perpendicular angle of 60 degrees to less than 90 degrees, with the direction immediately beneath the center of the luminaire being 0 degrees. The apparent size of the sparkling region is the solid angle w (steradian (sr)).

18 Claims, 21 Drawing Sheets

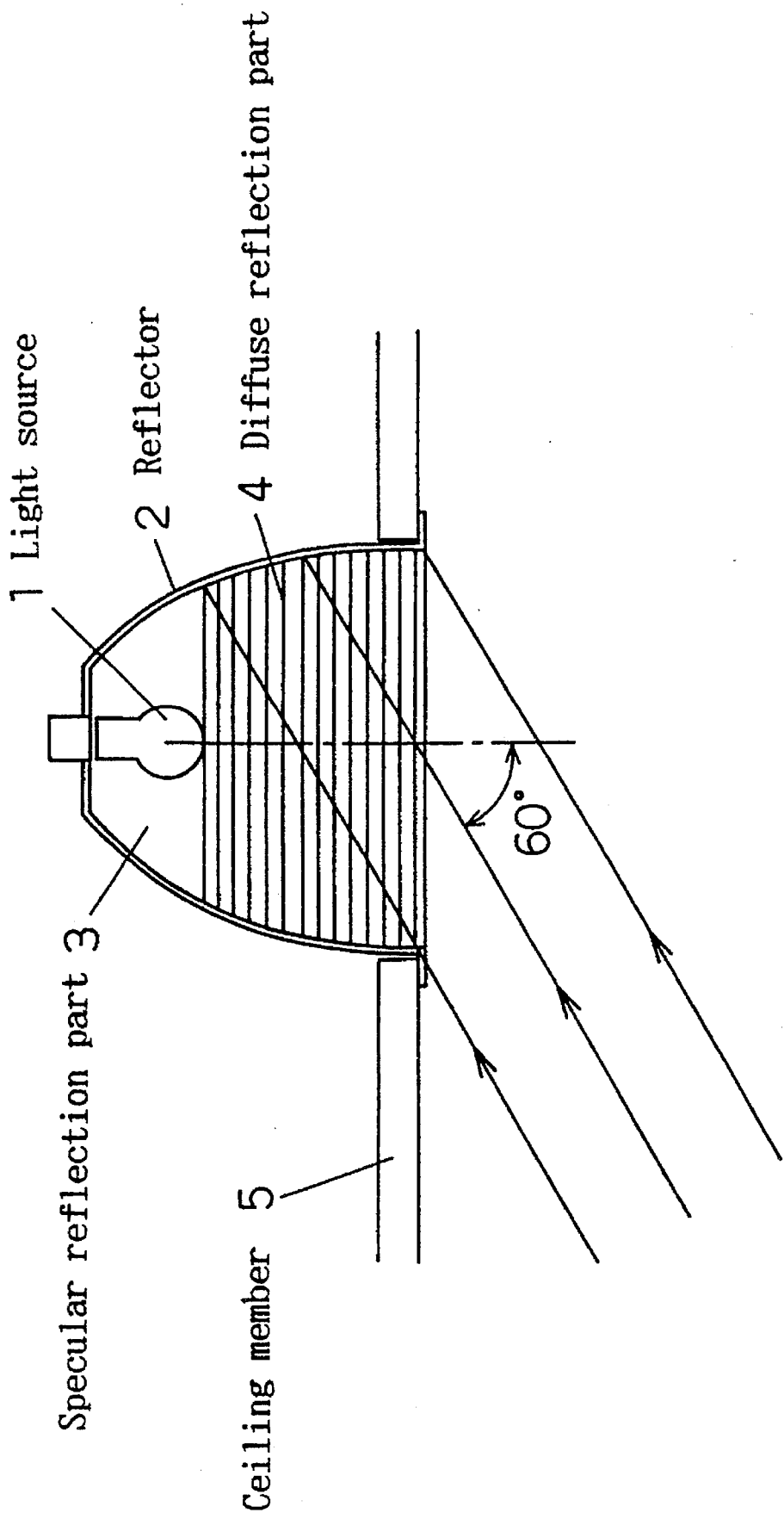

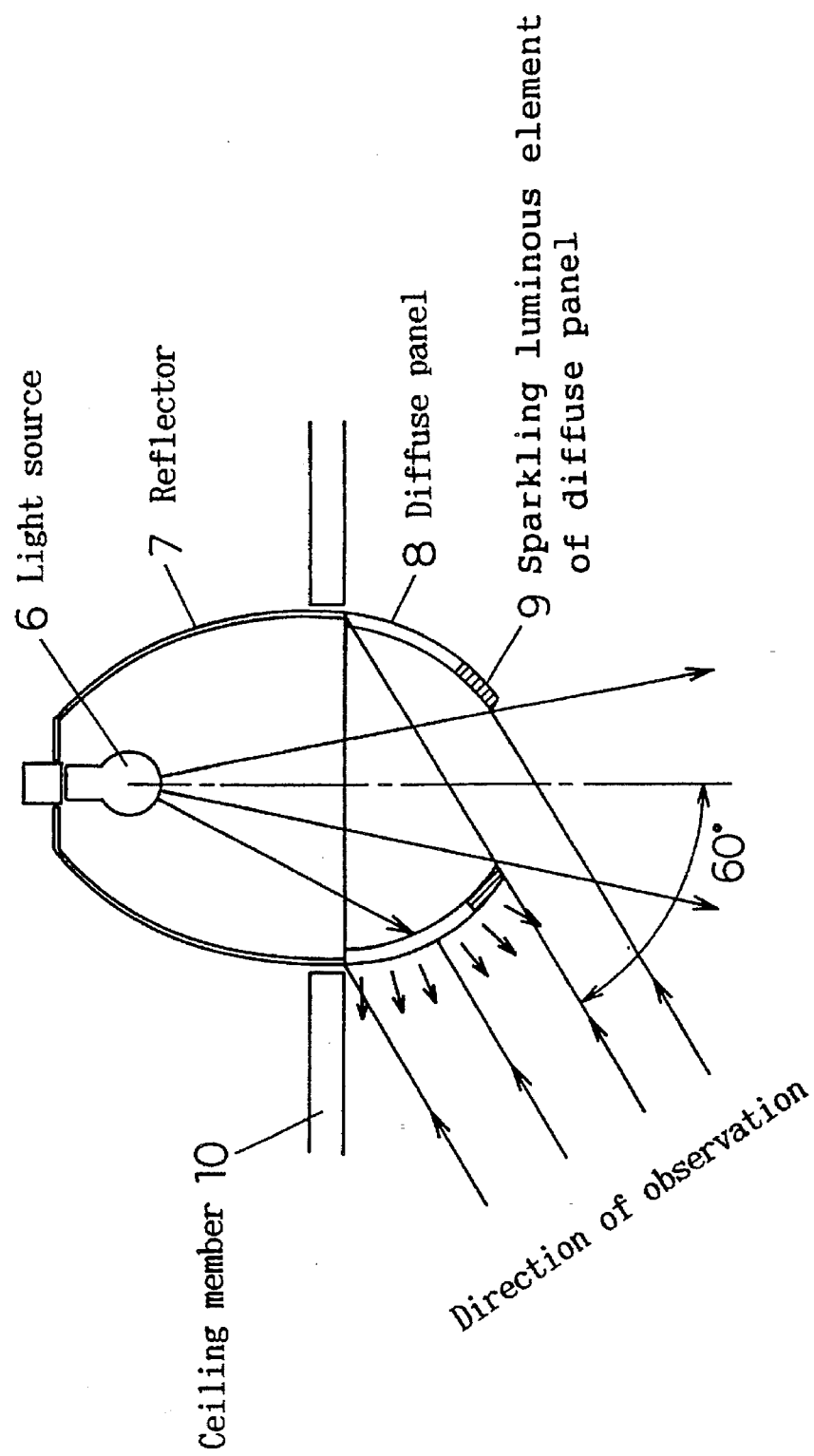

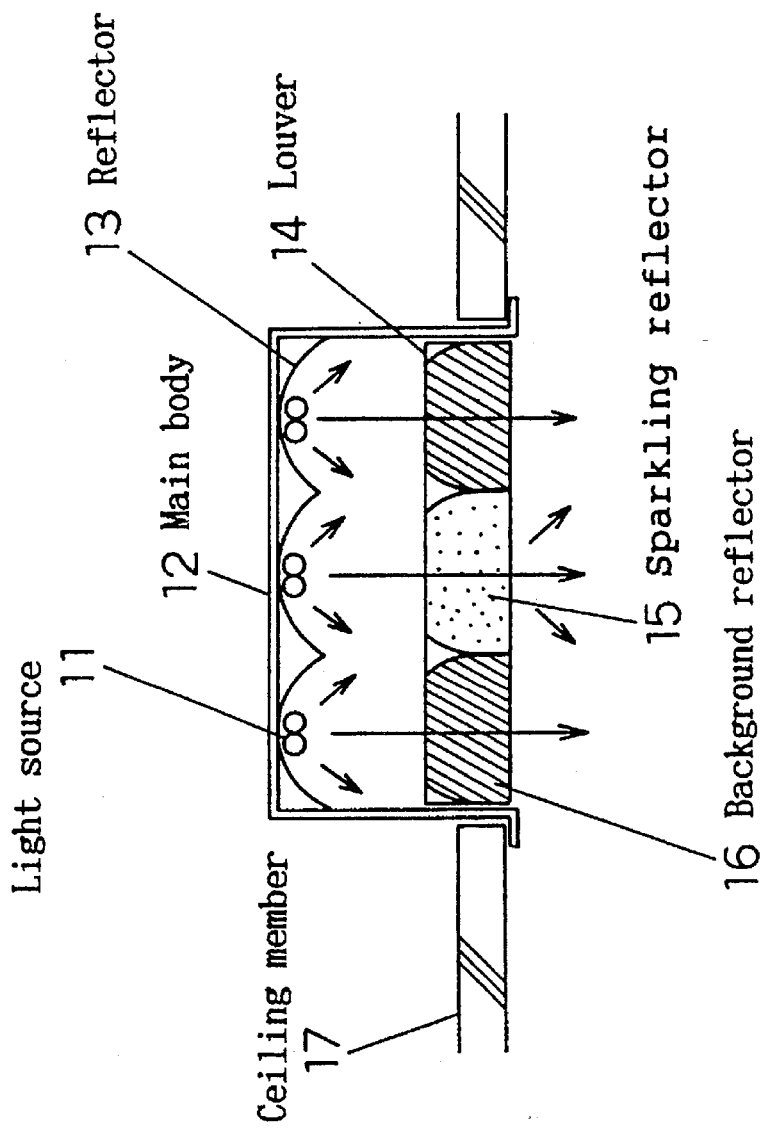
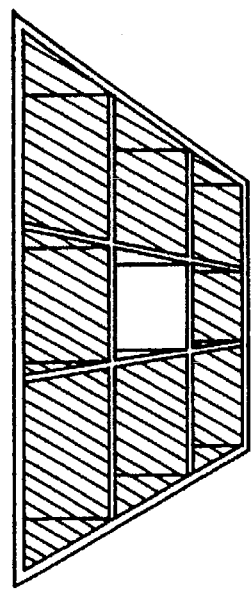
Fig. 4 (A)
Fig. 4 (B)

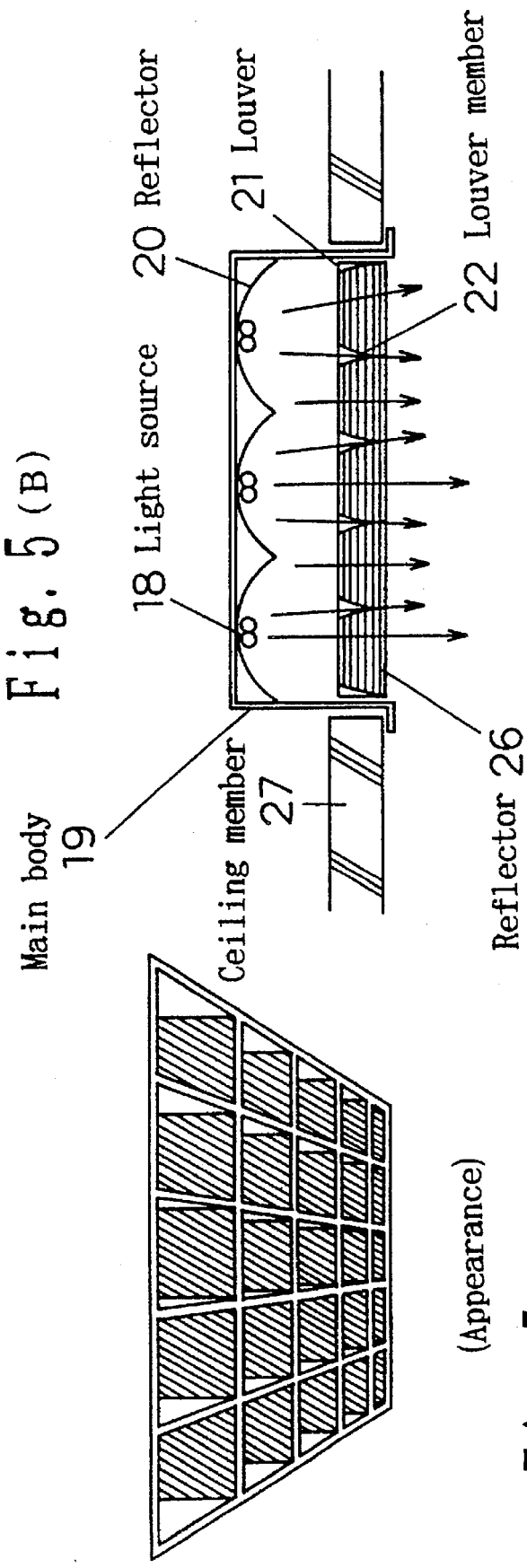
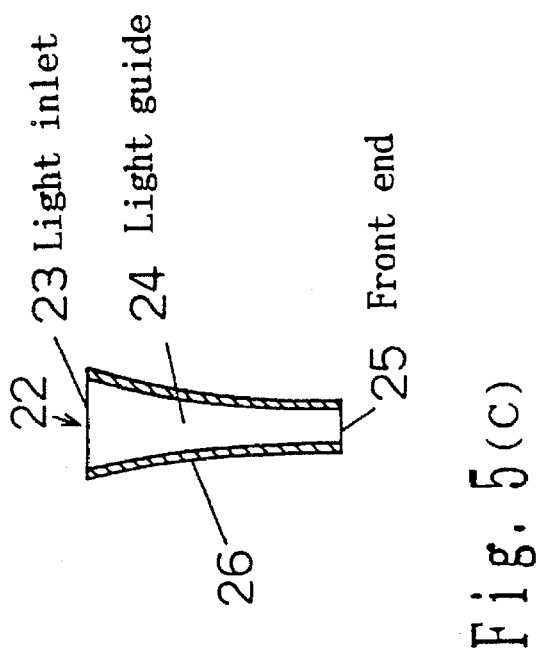
Fig. 5(A) (Appearance)
Fig. 5(B)
Fig. 5(C)
18 Light source
19 Main body
20 Reflector
21 Louver
22 Louver member
23 Light inlet
24 Light guide
25 Front end
26 Reflector
27 Ceiling member

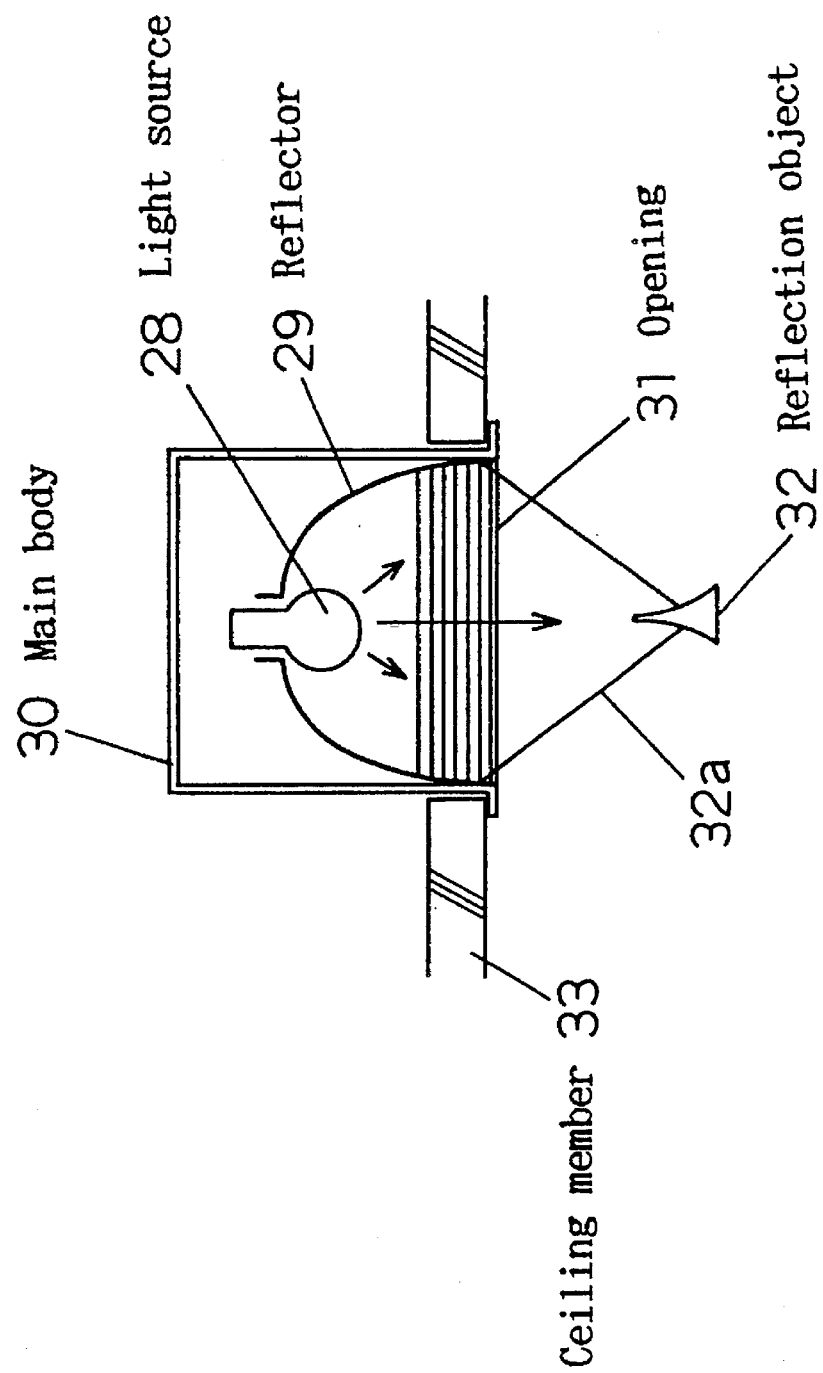

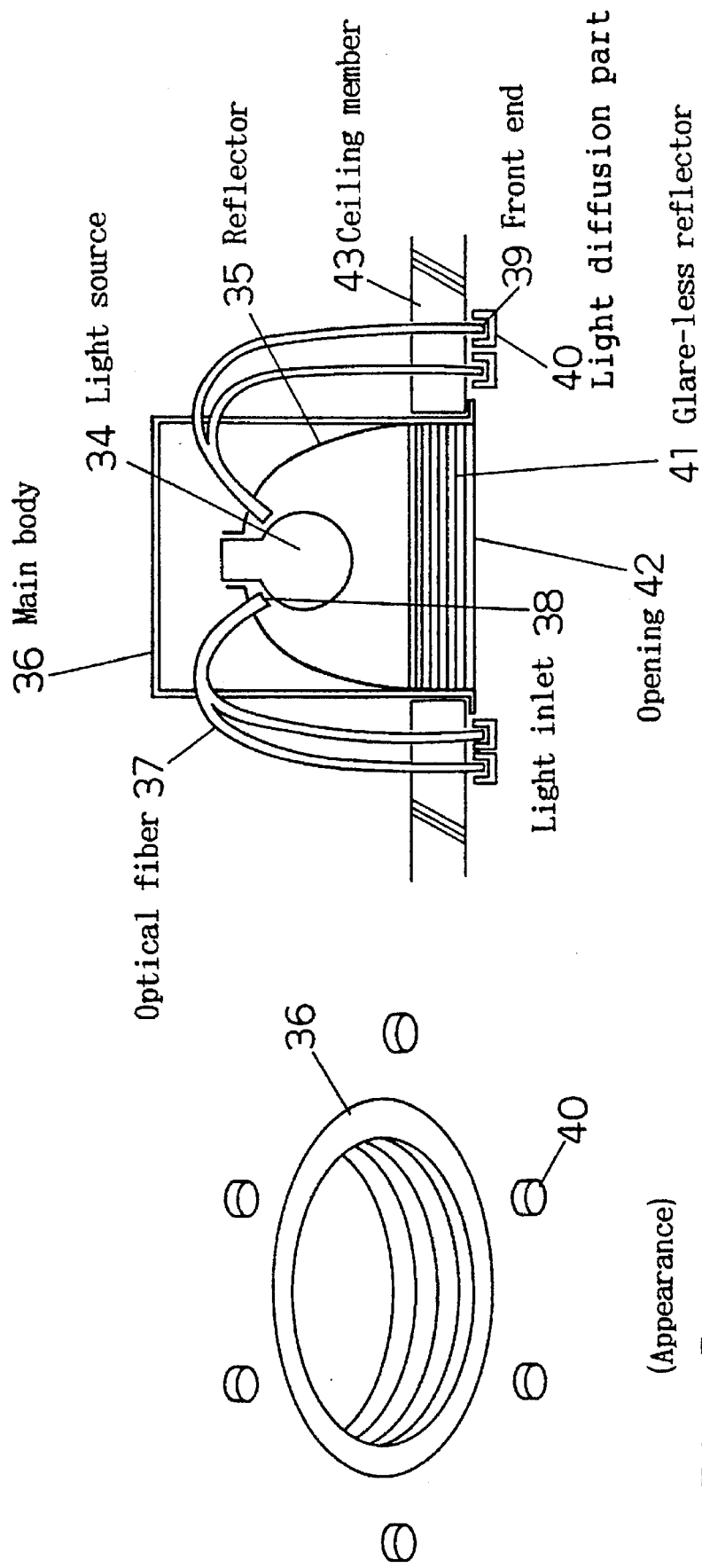

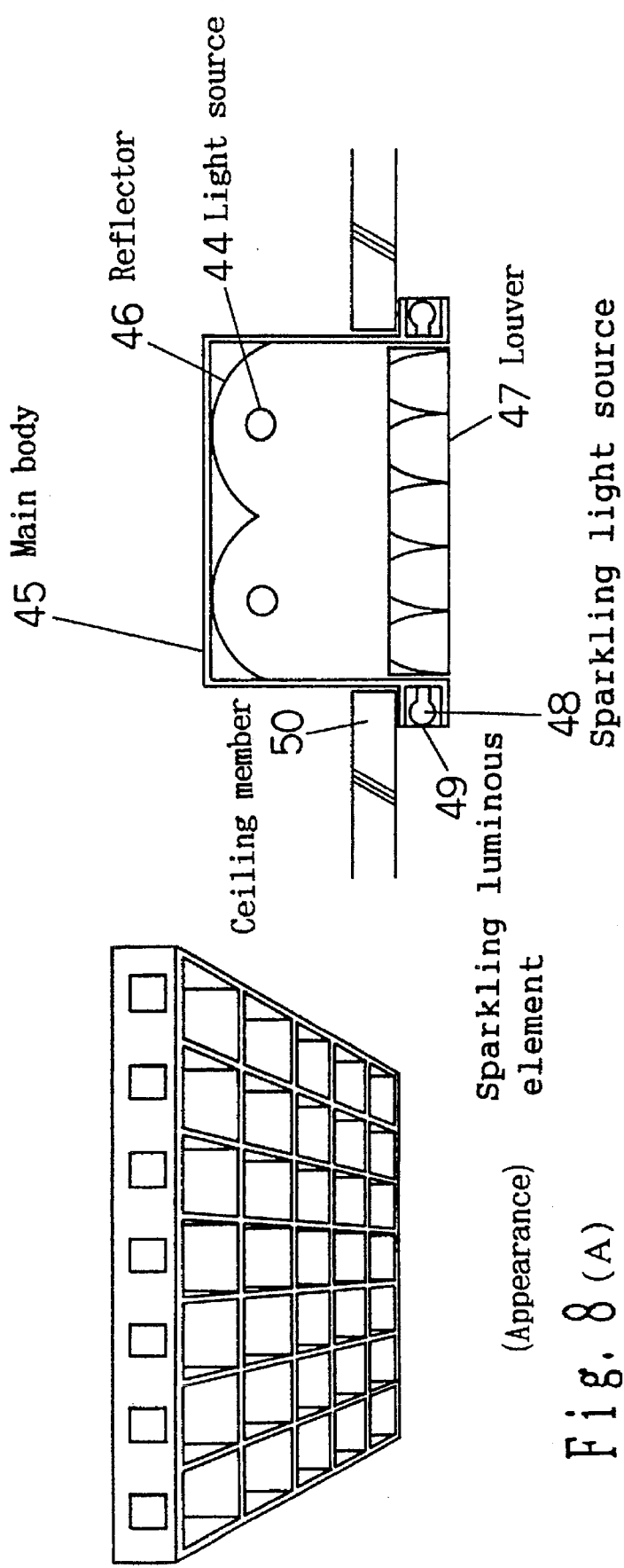

Test-box    Observer    Reference-box

Test-box    Reference-box

Exposed type luminaire

Lower open type luminaire

Glare controlled type luminaire

LUMINAIRE FOR INTERIOR LIGHTING

BACKGROUND OF THE INVENTION

1. Field of the Invention

The present invention relates to a luminaire to be used in interior lighting like offices to increase brightness sensation in the room without giving glare.

2. Related Art of the Invention

FIG. 17 shows a schematic diagram of three representative types of conventional indoor luminaire, and FIG. 18 shows the relation between the downward vertical angle from nadir and luminance in the conventional luminaire.

FIG. 17 (a) shows the so-called exposed type luminaire, which is designed to distribute light almost uniformly to the working surface, wall surface and ceiling, and the lamp is seen directly.

The luminance at 45 degrees to 85 degrees of the downward vertical angle from nadir (the direction of direct vision in ordinary sitting position) is about 8000 cd/m$^2$ as shown in FIG. 18 (a). The downward projected area of the luminaire luminous element is about 0.035 m$^2$.

FIG. 17 shows the so-called glare controlled type luminaire, in which a wedge-shaped lattice louver is attached to the lower surface of the luminaire in order to prevent glare by reflection on the CRT surface of VDTs (Visual Display Terminals) or the like.

Accordingly, as shown in FIG. 18, the light distribution of luminous intensity at the downward vertical angle of 60 degrees or more of the luminaire is strictly limited, and the luminance at the downward vertical angle of 60 to 85 degrees is 50 cd/m$^2$ or less. The downward projected area of the luminous element is about 0.35 m$^2$.

FIG. 17 (b) is intermediate of (a) and (c), and it is generally called the lower open type luminaire, and the lamp is seen directly when installed closely to the office worker, but the lamp is not seen directly when installed at a horizontal distance of about 15 m or more.

The luminance of this luminaire at the downward vertical angle of 60 to 85 degrees is about 1500 to 6000 cd/m$^2$ as shown in FIG. 18, and the downward projected area of the luminous element is about 0.35 m$^2$.

These lighting implements are used in ordinary offices, and other types include the lamp called downlight which is mainly used in shops, and the luminaire for small fluorescent lamps.

The downward projected area of the luminous element of these lighting implements is 0.0122 to 0.0177 m$^2$ (the diameter is about 0.125 to 0.15 m).

In addition to these representative lighting implements used indoors, the luminaire generally called chandelier is known.

It is not intended to "illuminate something," but is to present a gorgeous atmosphere by giving sparkle and brilliance by combining small incandescent lamps of high luminarice and glass beads or the like.

Its luminous element comprises the lamps and glass beads, and the downward projected area of each light emitting unit is 0.001 m$^2$ or less.

Accordingly, the apparent size at a distance of several meters is about 4×10$^{-5}$ [sr], and the luminance is more than 20,000 [cd/m$^2$].

However, in the exposed type luminaire shown in FIG. 17 (a), since the luminance at the downward vertical angle of 60 to 85 degrees to be seen directly in the ordinary sitting position is high, about 8000 cm/m$^2$ as shown in FIG. 18, and glare may be felt when seen at the downward vertical angle in this range.

In the glare controlled luminaire in FIG. 17 (c), to prevent glare to the human eye or glare by reflection on the CRT surface, the luminance of the luminous element (direction of 60 to 85 degrees of perpendicular angle) seen in the ordinary sitting position is controlled under 50 cd/m$^2$, and it is sometimes until whether the light is lit or not, and the office worker does not know from which direction the light is coming and feels uncomfortable, and moreover since there is no bright part on the ceiling, the entire room is gloomy, and the visual environment is dark.

In the lower open type luminaire in FIG. 17 (b), the luminance of the luminous element (60 to 85 degrees of perpendicular angle) of the luminaire seen in ordinary sitting position is about 1500 to 6000 cd/m$^2$, and the lamp is seen directly at a close distance and the glare is significant.

At a long distance, to the contrary, since the lamp is shielded, glare is eliminated, but the room looks gloomy because there is no bright part of luminous element on the ceiling same as in the glare controlled type luminaire in FIG. 17 (c).

In the downlight, on the other hand, using incandescent lamps or small fluorescent lamps, the luminance in the downward vertical angle range of 60 to 90 degrees is about 2000 to 6000 cm/m$^2$ and there is no glare in the downlight at a long distance from the observer, but the glare is felt from the downlight at a close distance.

Furthermore, the chandelier gives a gorgeous atmosphere by the diamond-likebrilliance and is free from gloomy feeling, but the absolute quantity of light is small, and enough illumination for visual work cannot be obtained.

Besides, the overall size of the chandelier is relatively large and it is suspended from the ceiling, and hence it may give a feeling of oppression or block the visual field when used in an office with a low ceiling of about 2.5 m.

SUMMARY OF THE INVENTION

In the light of the problems of the prior art, it is hence a primary object of the invention to present an indoor luminaire capable of providing the working surface with a desired illumination, presenting a brightness sensation in the entire room, and giving an active atmosphere, without giving glare directly to office workers, giving dimming impression on the ceiling, or blocking the visual field substantially.

To achieve the object and give a brightness sensation in the entire room, the invention is constituted to realize an appropriate relation between the area of the bright region of the luminous element and the luminance.

An indoor luminaire of the present invention is that; at least one bright region where a relation of luminance L of the bright region of the luminous element and solid angle w of the area of the bright region of the luminous element satisfies such condition of $$3.3 \leq \log L \leq -0.3 \log w + 2.63$$

or $$\log L \leq -0.3 \log w + 2.63$$
$$3.64 \leq \log L \leq 3.90,$$

supposing luminance of the bright region of a luminous element in a room to be L [unit: cd/m$^2$] and an apparent size of the bright region to be solid angle w [unit: steradian (sr)], is visible on the luminous element at any position in a specified area of the room, the specified area being determined on the basis of the luminous element in the room.

As in the constitution, by setting the luminance L and the apparent size (solid angle w) of the luminous element, the luminaire gives a brightness sensation in the room without giving uncomfortable glare to the office workers.

BRIEF DESCRIPTION OF THE DRAWINGS

FIG. 1 is a structural drawing of an indoor luminaire in an embodiment of the invention.

FIG. 2 is a structural drawing of an indoor luminaire in other embodiment of the invention.

FIGS. 4(A) and 4(B) are structural drawings of an indoor luminaire in other embodiment of the invention.

FIGS. 5(A)–5(C) are structural drawings of an indoor luminaire in other embodiment of the invention.

FIG. 6 is a structural drawing of an indoor luminaire in other embodiment of the invention.

FIGS. 7(A) and 7(B) are structural drawings of an indoor luminaire in other embodiment of the invention.

FIGS. 8(A) and 8(B) are structural drawings of an indoor luminaire in other embodiment of the invention.

EMBODIMENTS

It is generally known by experience that the glare is large when the luminance of the luminous element of a luminaire is high, and is lowered in its existence when low.

It is also known by experience that the glare increases when the apparent size of the luminous element having the luminance of hundreds of times of the adaptation luminance of the human eye is acclimatized to becomes larger, and that a sparkling impression is given when smaller.

These phenomena are considered to contribute greatly to the brightness impression (called brightness sensation hereinafter) of the illuminated room.

By providing the luminous element of the luminaire with an appropriate luminance, we experience that the entire room is felt bright by the hint of illumination of the room by that luminous element.

To the contrary, when the luminance of the luminous element of the luminaire is too high, glare occurs, and it causes that the entire room is felt dark.

Considering these facts together, it is estimated there is an adequate range for the luminance of the luminous element of a luminaire for increasing the brightness sensation of the room.

Hitherto, however, there was no quantitative data of discussion of their relationship, and it was not known how to determine the illumination conditions of bright region of the luminous element for increasing the brightness sensation.

Accordingly, the inventors conducted an evaluation experiment about the brightness sensation of the room in various conditions of luminance, size and shape of the luminous element and background luminance of the bright region, in order to clarify the condition of the bright region of the luminous element capable of increasing the brightness sensation of the room.

[Outline of experiment]

Figure 9:
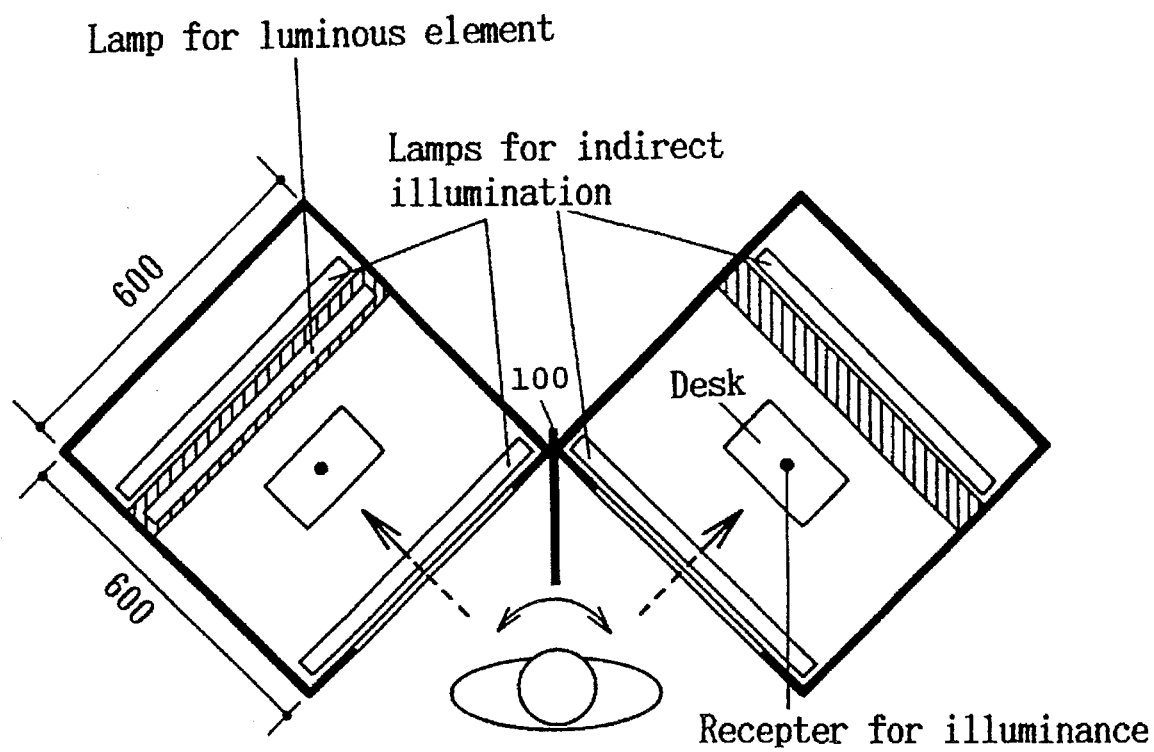
FIGS. 9(A) and 9(B) are structural drawings showing an apparatus of experiment.
Figure 9:
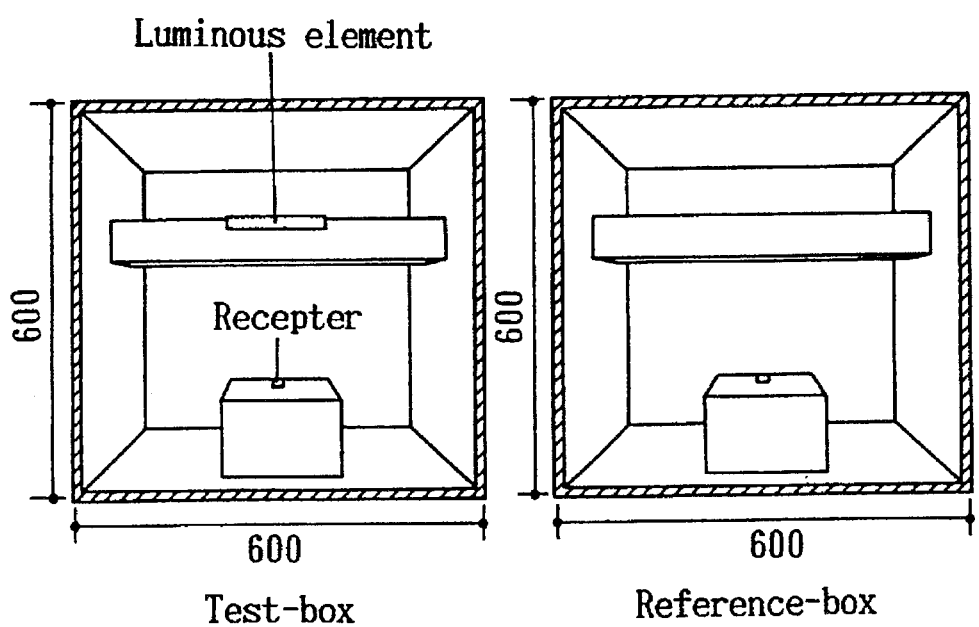

The apparatus of experiment consists of two boxes (test box, reference box) incorporating ⅕ scale office models as shown in FIG. 9(A). That is the boxes are disposed in front of the observer and between the boxes a dividing plate 100 is arranged. FIG. 9(B) shows each interior view of the boxes, which is looked from the observer. In each box, a desk and a bar-shaped luminaire are installed as shown in FIGS. 9(A) and 9(B), and the light source for illuminating the entire room uniformly is disposed at a place not directly visible from the observer. In the test box only, the luminous element is installed at a position visible from the observer, and this luminous element can be independently changed in its size (solid angle), luminance and background luminance. In this method of apparatus, since there is no uneven luminance in the luminous element, the entire luminous element is regarded as the bright region.

In the experiment, each observer was seated at a specified position, and each experimental condition varying the luminance and solid angle of the luminous element and the background luminance was presented in the test box. After the observer was adapted to each experimental condition sufficiently, the illuminance of the reference box was adjusted until the overall brightness sensation of the test box and reference box was the same. After the adjustment, the illuminance (Er) of the reference box and the illuminance (Et) of the test box were measured. After the measurement, the observer evaluated the impression of the luminous element of the test box in one of the three categories: glaring, sparkling, bright.

[Results of Experiment]

In analyzing the data adjusted by all observers, Er/Et was determined as "isobrightness feel illuminance ratio". It expresses the ratio of illuminance of both boxes when the test box having the luminous element in the visual field and the reference box without luminous element are same in the brightness sensation of the room. When the isobrightness feel illuminance ratio (Er/Et) is 1 or less, the luminous element has no effect of increasing the brightness sensation in the room, and when larger than 1, the luminous element has the effect of increasing the brightness sensation in the room, and the larger value means the greater effect.

Figure 10A:
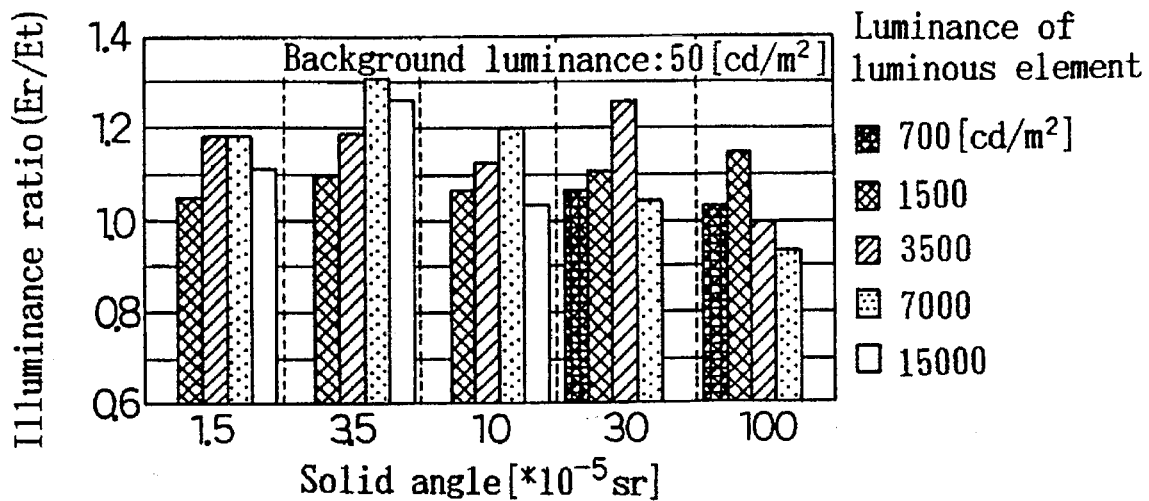
FIGS. 10(A)–10(C) are bar graphs of result of experiment of "isobrightness feel illuminance ratio" (Er/Et) (background luminance: 50, 100, 200 cd/m$^2$).
Figure 10B:
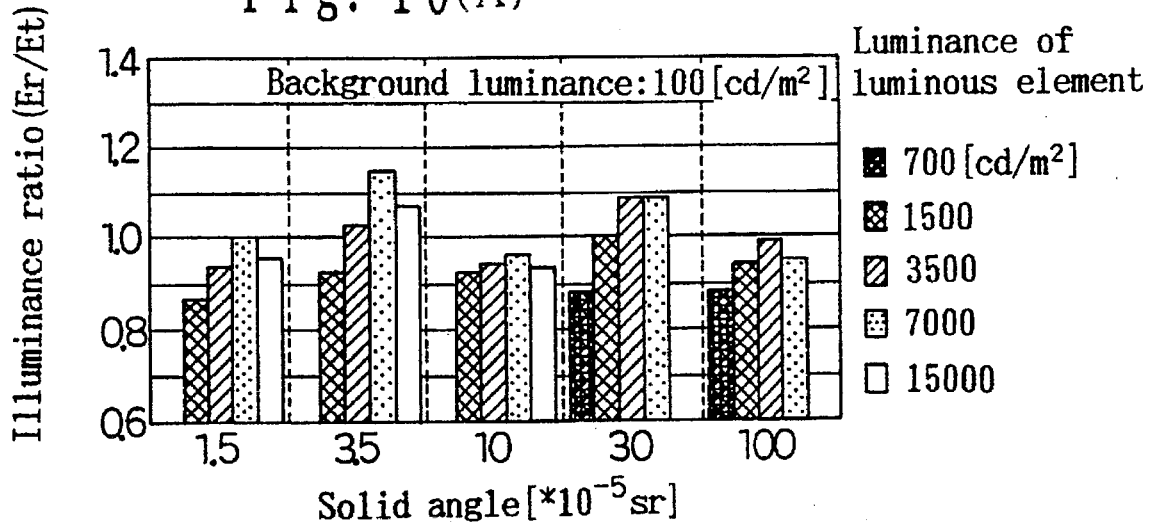
Figure 10C:
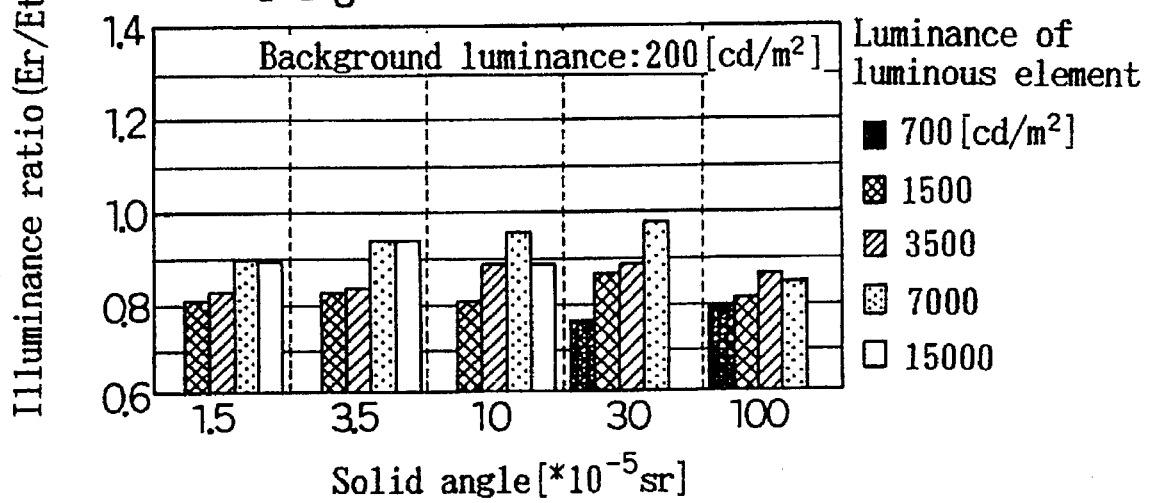

For example, FIGS. 10(A),(B) and (C) shows the isobrightness feel illuminance ratio in the rectangular shape of the luminous element at aspect ratio of 1/6, and various conditions of the luminance and size of the luminous element and background luminance. In FIGS. 10(A), (B), and (C) respectively show the isobrightness feel illuminance ratio (Er/Et) at the background luminance of 50, 100, and 200 cd/m$^2$. The following facts are known from FIGS. 10(A), (B) and (C): (1) the isobrightness feel illuminance ratio (Er/Et) is approximately in a range of 0.8 to 1.3, (2) the isobrightness feel illuminance ratio (Er/Et) is high at the background luminance of 50 cd/m$^2$, and declines as the background luminance becomes higher, and is smaller than 1 at the background luminance of 200 cd/m$^2$, and (3) the "isobrightness feel illuminance ratio" (Er/Et) reaches the peak in the specific conditions of the luminance and size of the luminous element.

Figure 11:
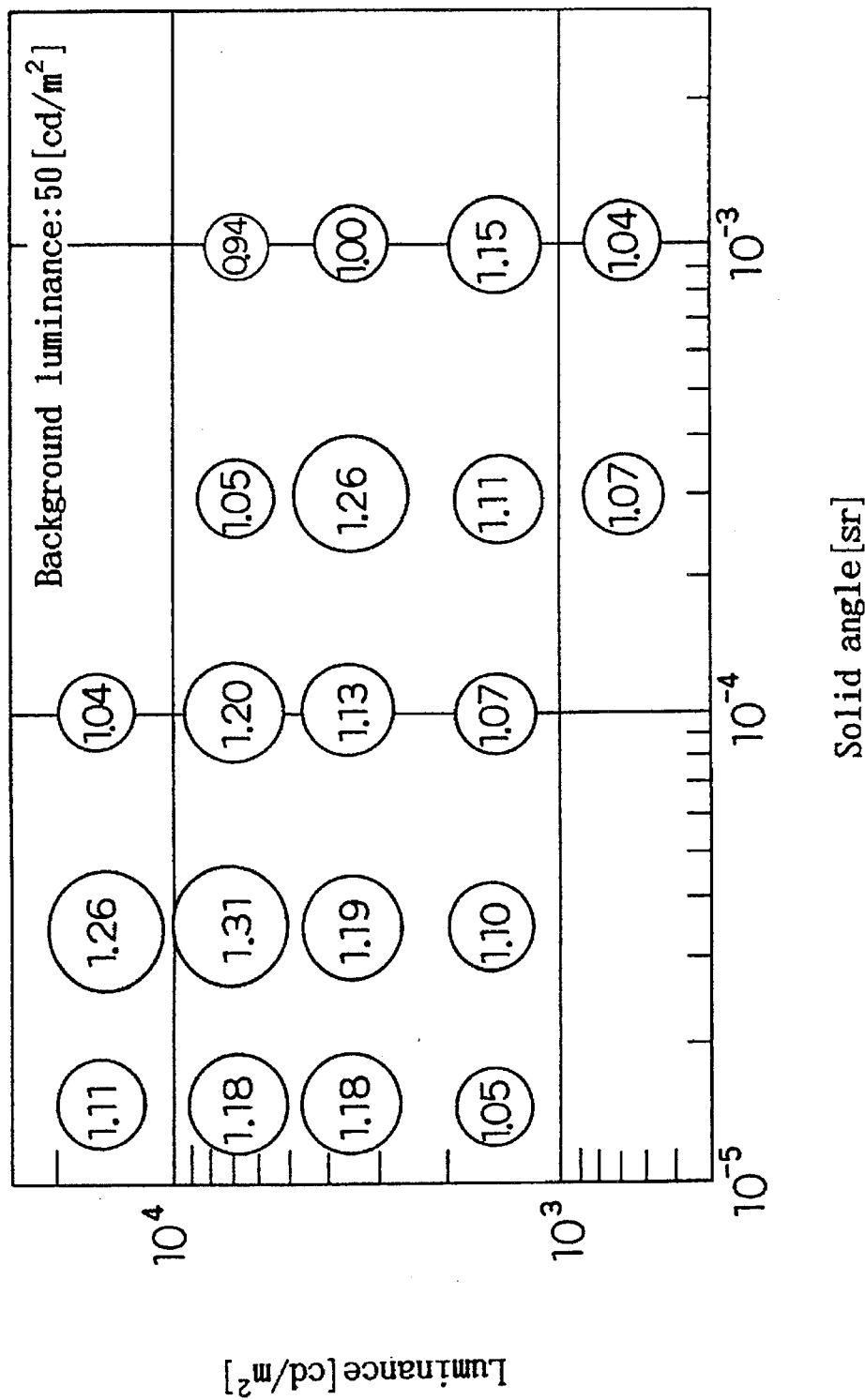
FIG. 11 is a graph of result of experiment of "isobrightness feel illuminance ratio" (Er/Et) (background luminance 50 cd/m$^2$).
Figure 12:
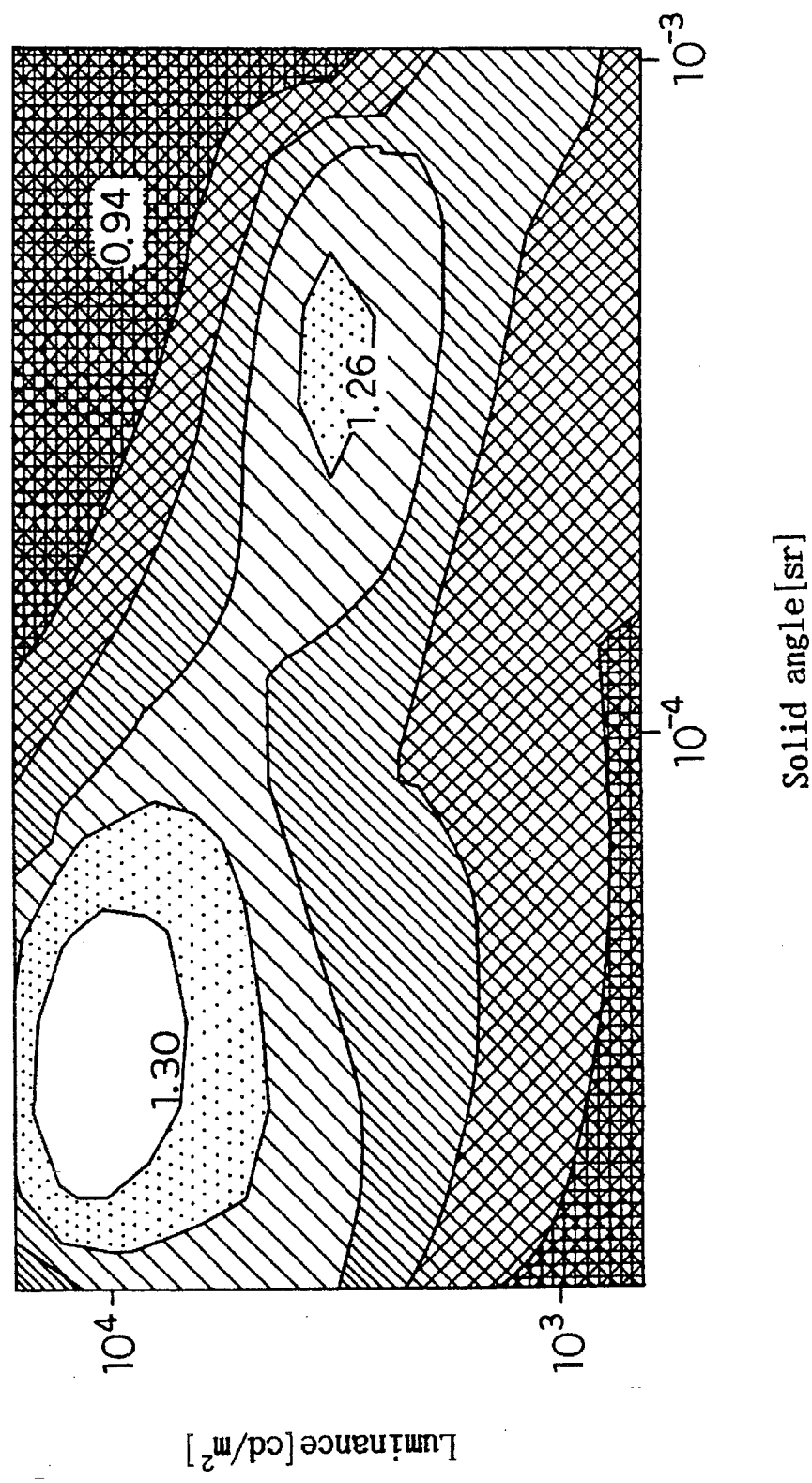
FIG. 12 is a contour map of "isobrightness feel illuminance ratio" (Er/Et) (background luminance 50 cd/m$^2$).
Figure 13:
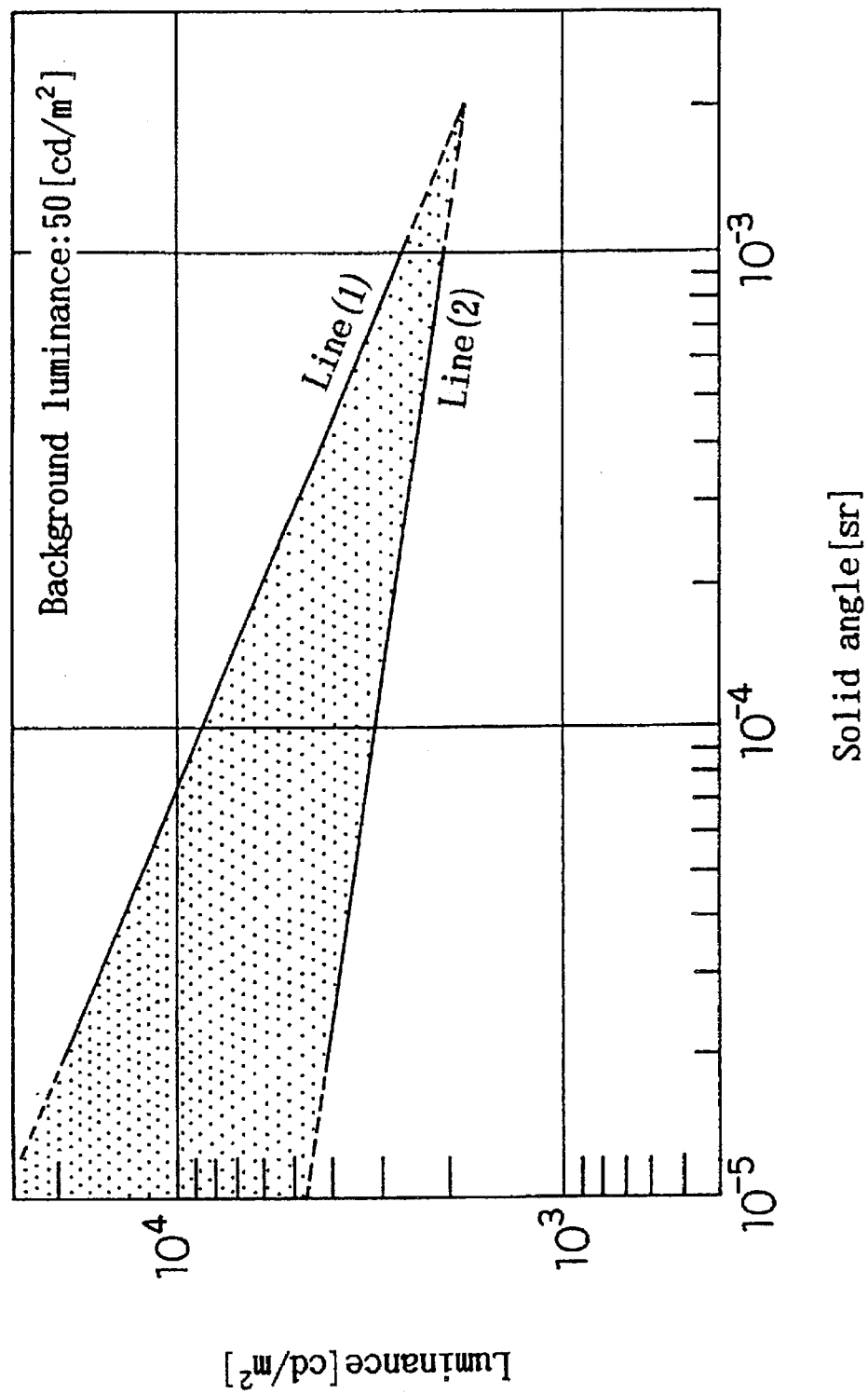
FIG. 13 shows the conditions of 1.2 or more of "isobrightness feel illuminance ratio" (Er/Et) (background luminance 50 cd/m$^2$).

To further investigate into the range of obtaining the peak of the isobrightness feel illuminance ratio (Er/Et), in the condition of the background luminance of 50 cd/m$^2$ achieving high isobrightness feel illuminance ratio (Er/Et), the ratio was compared on the coordinates, plotting the size of the luminous element on the axis of abscissas and the luminance on the axis of ordinates. The result is shown in FIG. 11. In FIG. 11, the central coordinates of each circle denote the experimental condition (luminance and size of luminous element), and the figure in each circle indicates the isobrightness feel illuminance ratio (Er/Et). The diameter of each circle is proportional to the "isobrightness feel illuminance ratio" (Er/Et). By higher degree interpolation on the basis of the results, a contour map of isobrightness feel illuminance ratio (Er/Et) was plotted. FIG. 12 shows an example of contour map of isobrightness feel illuminance ratio (Er/Et) in the condition of the background luminance of 50 cd/m$^2$ shown in FIG. 11. The map suggests that the isobrightness feel illuminance ratio (Er/Et) is high in a certain area. For example, when the brightness sensation of two rooms differs by more than 20%, any observer can recognize a significant difference in brightness sensation of the two rooms, and hence by regression analysis of the range of isobrightness feel illuminance ratio (Er/Et) of 1.2 or more, the range of high "isobrightness feel illuminance ratio" (Er/Et) was quantitatively specified. As a result, the range enclosed by line (1) and line (2) in FIG. 13 was determined in formula (1-1).

$$-0.18 \log w + 2.79 \leq \log L \leq -0.54 \log w + 1.77 \qquad (1\text{—}1)$$

where L is the luminance of the luminous element [unit: cd/m$^2$], and w is the apparent size of the luminous element (solid angle) [unit: sr (steradian)]. The range enclosed by these two lines is the range of the "isobrightness feel illuminance ratio" (Er/Et) of 1.2 or more. Furthermore, when the "isobrightness feel illuminance ratio" (Er/Et) is increased by 30% or more, an extremely great increase of brightness sensation is occurred, and hence in the range of formula (1-1), the range of the extremely high increasing effect of brightness sensation of 1.3 or more of the increasing effect of brightness sensation in the room was studied. As a result, in the range of formula (1-1), the range of approximately $3.6 \leq \log L \leq 4.3$ was found to be the range with the "isobrightness feel illuminance ratio" (Er/Et) of 1.3 or more.

Figure 14:
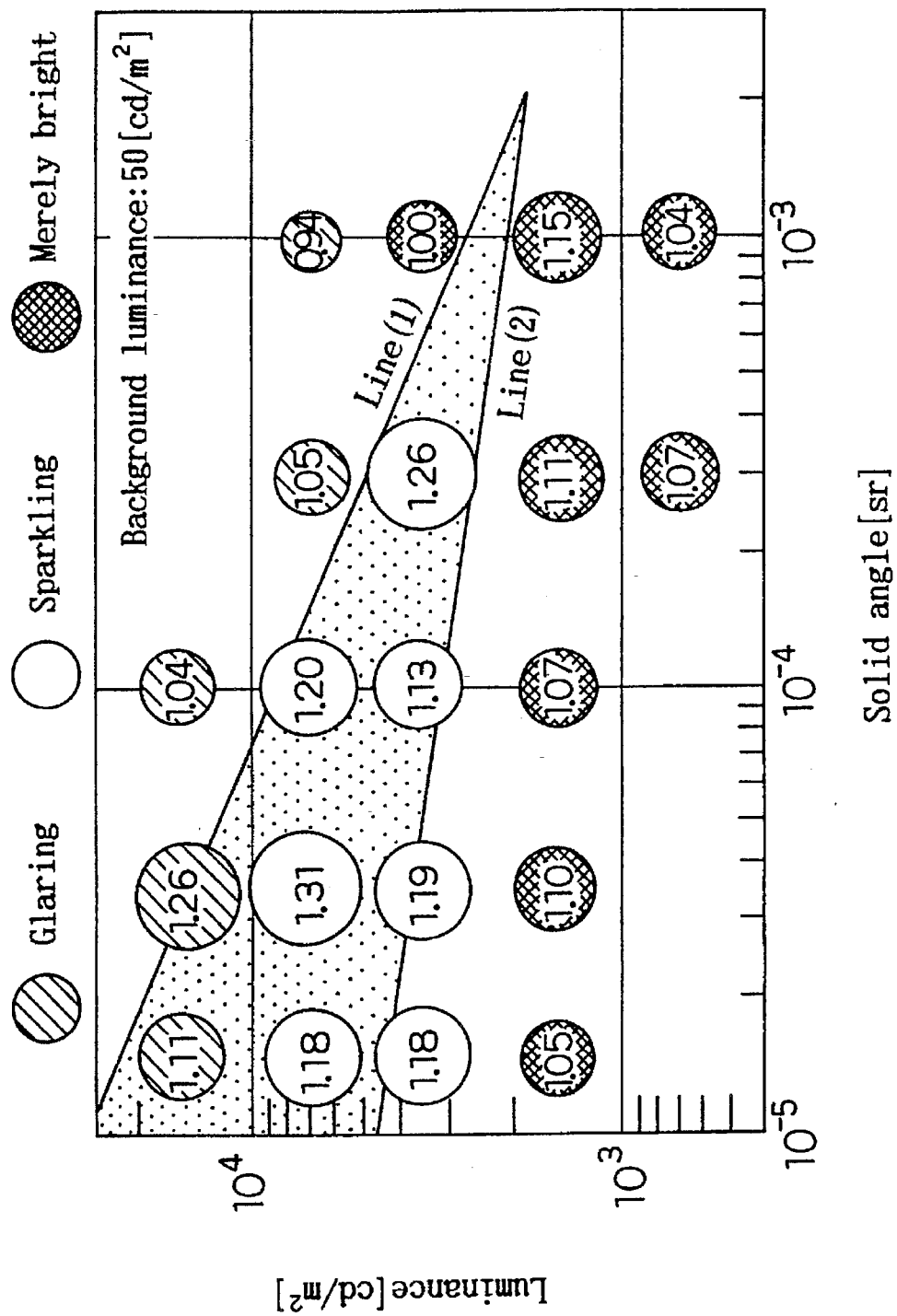
FIG. 14 shows subjective evaluation of impression of luminous element and isobrightness feel illuminance ratio (Er/Et) (background luminance 50 cd/m$^2$).

On the other hand, as for the subjective evaluation about the impression of the luminous element in the experimental conditions in the test box, the category gaining more than 50% of all replies obtained in the experiment was represented as the category of the impression of the luminous element in the specific experimental condition. The result is shown in FIG. 14. The coordinates and diameter of circles in FIG. 14 are same as in FIG. 11, and the shading pattern of each circle represents the category of impression of the luminous element. When the experimental condition evaluated as "sparkling" of the luminous element is compared with the range of the "isobrightness feel illuminance ratio" (Er/Et) of 1.2 or more enclosed by line (1) and line (2) in FIG. 13, the both are found to coincide nearly with each other.

In the same procedure as above, the data were analyzed in the conditions of different shapes of the luminous element, and the range for increasing the brightness sensation in the room was determined. As a result of comparison of the ranges, formula (1-2) was found to be appropriate as the range of increasing the brightness sensation in the room by about 1.2 or more as the "isobrightness feel illuminance ratio" (Er/Et).

$$3.3 \leq \log L \leq -0.3 \log w + 2.63 \qquad (1\text{-}2)$$

where L is the luminance of the luminous element [unit: cd/m$^2$], and w is the apparent size of the luminous element (solid angle) [unit: sr (steradian)]. In particular, the region for increasing the brightness sensation in the room by about 1.3 or more as the "isobrightness feel illuminance ratio" (Er/Et) is approximated in formula (2) and formula (3).

$$\log L \leq -0.3 \log w + 2.63 \qquad (2)$$

$$3.64 \leq \log L \leq 3.90 \qquad (3)$$

where L is the luminance of the luminous element [unit: cd/m$^2$], and w is the apparent size of the luminous element (solid angle) [unit: sr (steradian)].

As for the background luminance, even in the different conditions of aspect ratio of the luminous element, it was known that the increasing effect of the brightness sensation in the room is higher when the background luminance is lower than 200 cd/m$^2$.

[Conclusions]

The following conclusions were obtained from the experiment.

(1) When the relation of the luminance L of the bright region of the luminous element and the solid angle w of the luminous element is as follows, $$3.3 \leq \log L \leq -0.3 \log w + 2.63 \qquad (1\text{-}2)$$

the psychological brightness sensation is higher by about 1.2 times or more as the "isobrightness feel illuminance ratio" (Er/Et), as compared with the room where luminous elements are invisible or the room extremely low in the luminance of the luminous element.

(2) When the relation of the luminance L of the bright region of the luminous element and the solid angle w of the luminous element is as follows, $$\log L \leq -0.3 \log w + 2.63 \qquad (2)$$

$$3.64 \leq \log L \leq 3.90 \qquad (3)$$

the psychological brightness sensation is higher by about 1.3 times or more as the "isobrightness feel illuminance ratio" (Er/Et), as compared with the room without luminous element or the room extremely low in the luminance of the luminous element.

(3) The increasing effect of the psychological brightness sensation is enhanced when the background luminance of the luminous element is less than about 100 cd/m².

(4) The psychological brightness sensation is closely related with the impression of the luminous element such as sparkling and glaring, and when the luminous element is felt sparkling, the brightness sensation is enhanced.

Generally, the luminaire seen in a range smaller than the downward vertical angle of 60 degrees from the observer, that is, near above the head of the observer is remote from the usual viewing line (horizontal direction) of the observer, and is hence said to be hardly related with the sensation of glare for the observer and lacks in the sense of existence. Accordingly, the effect of the bright region of the luminous element for improving the brightness sensation is also considered to be greatest in the range 0f perpendicular angle of about 60 degrees to 90 degrees. Besides, to achieve the intrinsic object of the luminaire to maintain a specific illuminance on the horizontal plane, it is not appropriate to suppress the quantity of light released nearly in the under direction of the luminaire, that is, in the direction of 0 degree to 60 degrees of perpendicular angle. In other words, the light distribution in the direction of 0 to 60 degrees of perpendicular angle necessary for the illumination to keep the illuminance on the horizontal plane should be used for illumination and limitation of luminance should be restrained, and it is considered appropriate to assign the light distribution in the direction of 60 to 90 degrees of perpendicular angle effective for the brightness effect for the bright region for enhancing the brightness sensation in the room. In the invention, therefore, the condition for obtaining the effect of the bright region of the luminous element for enhancing the brightness sensation in the room is considered mainly in a range of 60 to 90 degrees of the downward vertical angle. However, similar effects are obtained when the conditions are satisfied in a range of, for example, 40 to 90 degrees, and practically it is not necessary to define the downward vertical angle in a range of 60 to 90 degrees. Furthermore, if light source or luminaire for keeping the illuminance on the horizontal plane is installed together, and the luminaire in question is not required to have function for keeping the illuminance on the horizontal plane in particular, especially in the case of the luminaire small in the apparent size of the luminaire, without defining the downward vertical angle of the bright region influencing the brightness sensation in a range of 60 to 90 degrees, the condition may be set to satisfy the formula (1-2), (2) or (3) in the range of the whole perpendicular angle.

Figure 17A:
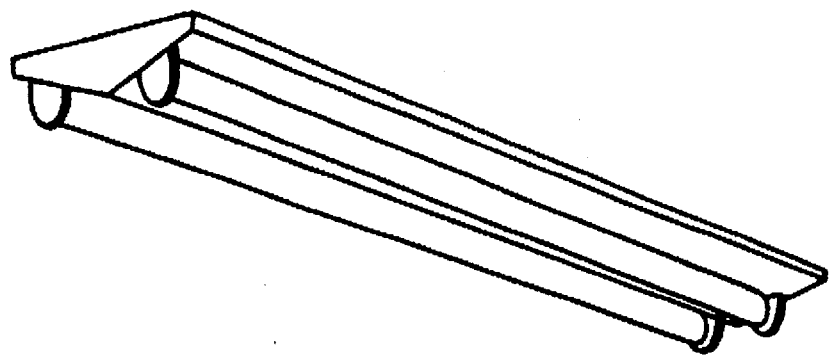
FIGS. 17 (a) to (c) shows the appearance of representative conventional indoor lighting implements.
Figure 17B:
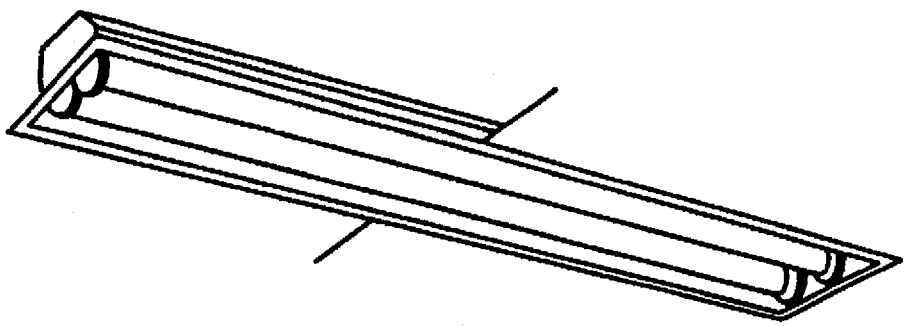
Figure 17C:
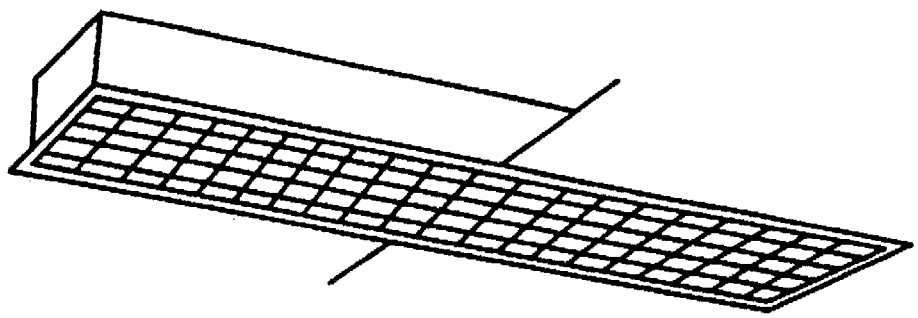
Figure 18:
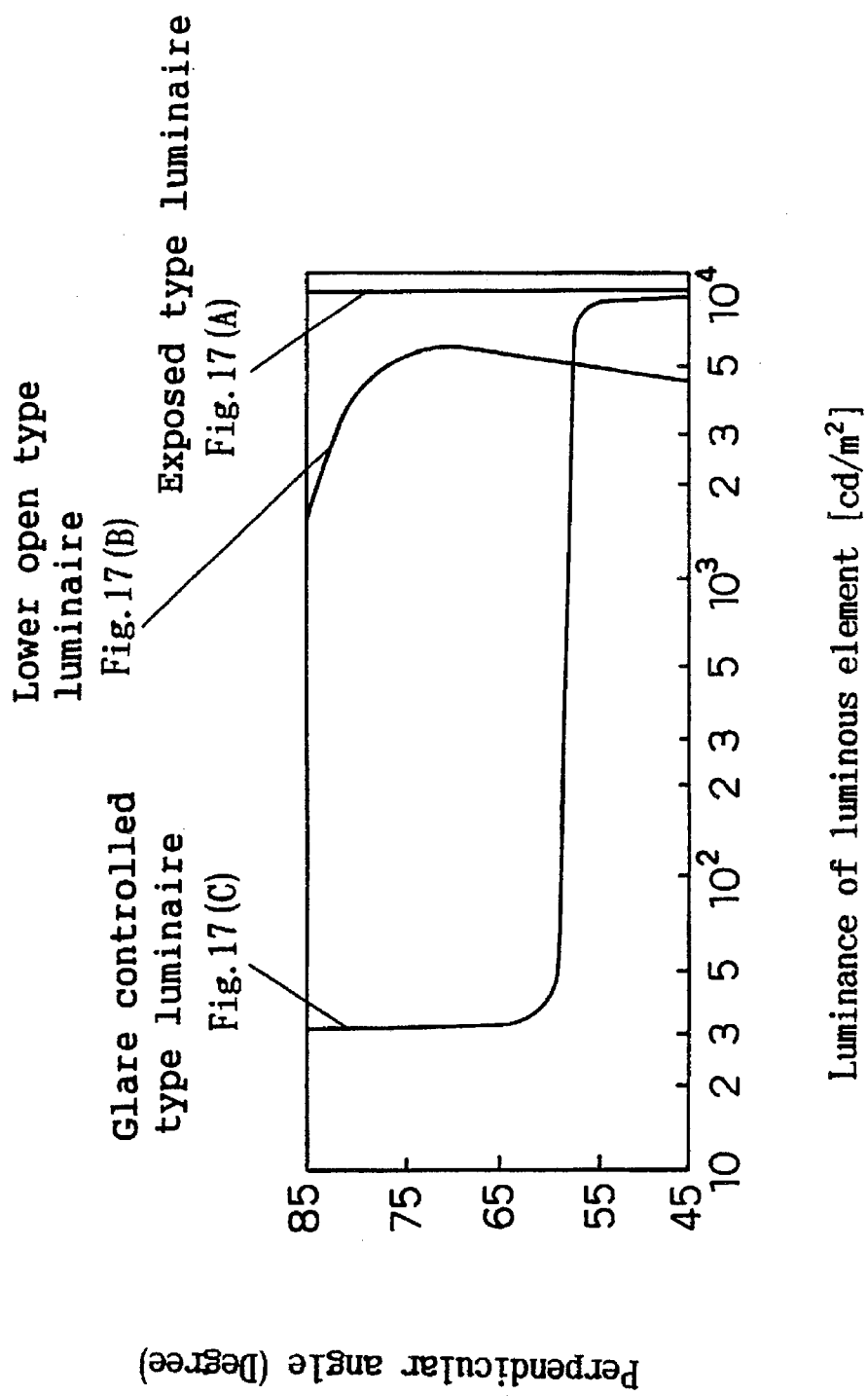
FIG. 18 is a diagram showing the luminance distribution of conventional lighting implements (luminance of luminous element at each perpendicular angle).
Figure 19:
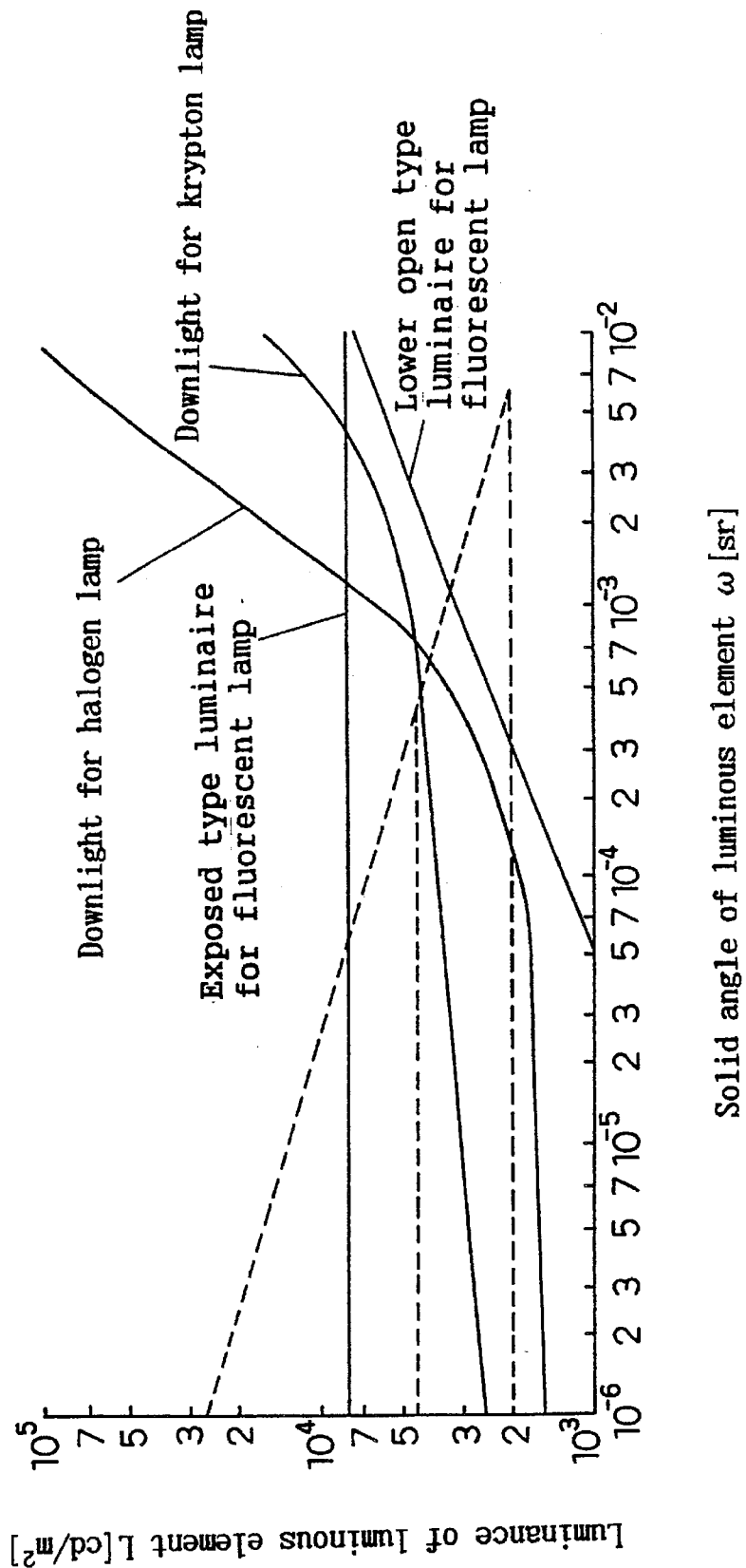
FIG. 19 is a diagram showing the luminance of conventional lighting implements (relation between size of luminous element and luminance).

Compare with the conventional lighting implements represented by the lighting implements shown in FIG. 17 and FIG. 18. For example, the luminance of the luminous element of the exposed type luminaire is 8000 cd/m² as seen from any position regardless of the apparent size (solid angle w), and its distribution of luminous intensity is expressed in formula (4).

$$\log L = 3.9 \tag{4}$$

Accordingly, when this luminaire is installed in a room with the ceiling height of 2.5 m and is observed by the observer at a perpendicular angle of 60 degrees from the seated position (eye height 1.2 m), its solid angle is $2.7 \times 10^{-3}$ sr, and the luminance is 8000 cd/m², and hence the glare is very severe.

This glare occurs when seen in a perpendicular angle range of 60 to 80 degrees, not limited to 60 degrees alone.

The apparent size (solid angle w) and luminance of the luminous element of the conventional lower open type luminaire are in a range as shown in FIG. 18, and its light distribution is expressed in formula (5).

$$\log L = 0.38 \log w + 4.63 \tag{5}$$

Accordingly, when this luminaire is installed in a room with the ceiling height of 2.5 m and is observed by the observer at a perpendicular angle of 60 degrees from the seated position (eye height 1.2 m), its solid angle is $2.7 \times 10^{-2}$ sr, and the luminance is 10000 cd/m², and hence the glare is very severe.

This glare occurs when seen in a perpendicular angle range of 60 to 80 degrees, not limited to 60 degrees alone.

Figure 15:
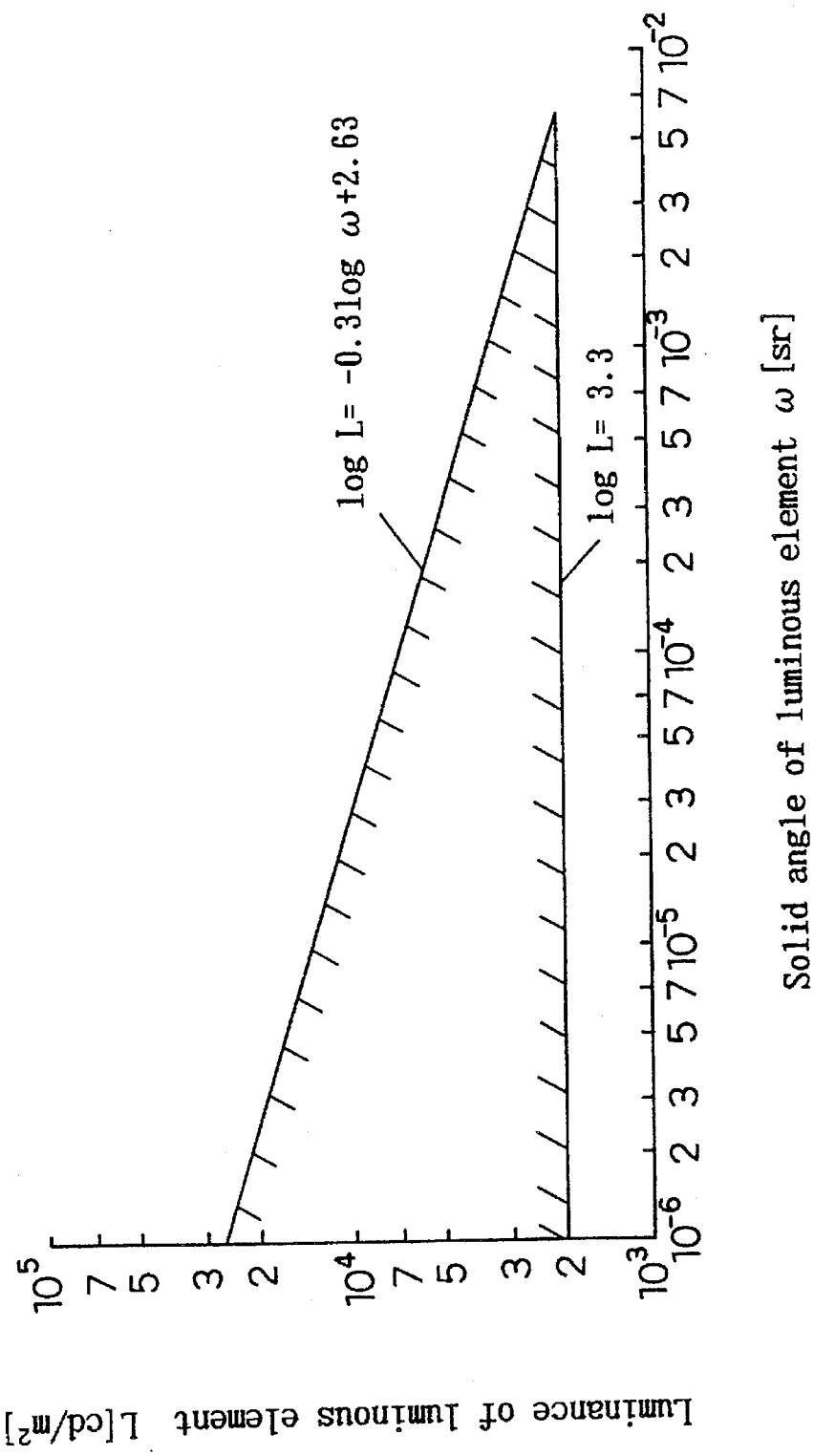
FIG. 15 shows the range of high increasing effect of brightness (range of 1.2 or more of isobrightness feel illuminance ratio Er/Et).

Moreover, in the conventional glare controlled type luminaire, since the luminance is low, it is outside the region shown in FIG. 15, and does not overlap with the region of the invention.

On the other hand, in the conventional lighting implements for downlight, various distributions of luminous intensity are available. For example, the light distribution of the luminaire using halogen lamp is narrow in angle and high in directionality, and when it is installed in a room with the ceiling height of 2.5 m and is observed by the observer at a perpendicular angle of 60 degrees from the seated position (eye height 1.2 m), its solid angle is $9.0 \times 10^{-4}$ sr, and the luminance is about 5000 cd/m², and hence the glare is severe.

When seen at the downward vertical angle of 80 degrees, its solid angle is $3.5 \times 10^{-5}$ sr, and the luminance is about 1700 cd/m², and hence it feels dark.

In some of the conventional lighting implements for downlight, the directionality is lowered by distribution of luminous intensity of wide angle.

For example, the light distribution of the luminaire for 60 W krypton lamp is expressed in formula (6) in the relation between the apparent size (w) and luminance (L) of the luminous element. (In formula (6), however, only the range of $w \leq 6 \times 10^{-4}$ is approximated linearly.)

$$\log L = 0.067 \log w + 3.8 \tag{6}$$

Accordingly, when this luminaire is installed in a room with the ceiling height of 2.5 m and is observed by the observer at a perpendicular angle of 60 degrees from the seated position (eye height 1.2 m), its solid angle is $5.8 \times 10^{-4}$ sr, and the luminance is 4800 cd/m², and hence the glare is very high.

The luminance distribution of an ordinary chandelier is expressed in formula (7).

$$\log L = 4.3 \tag{7}$$

Accordingly, the range of very small solid angle with the apparent size of the light source of less than $3 \times 10^{-6}$ sr overlaps with the region of increasing effect of the brightness sensation of formula (1-2) of the invention.

However, the solid angle of $3 \times 10^{-6}$ sr is $2 \times 10^{-5}$ sr (a circle with diameter of 5 mm) when converted to the luminaire installed in a room with the ceiling height of 2.5 m as seen from the downward vertical angle of 60 degrees, and hence the light source is very small, the luminous flux is very small, and it cannot be used as the light source for illumination.

None of the lighting implements mentioned above will ever overlap, at the downward vertical angle of 60 to 90 degrees, with the region expressed by formulas (2) and (3) high in the effect of increasing the brightness sensation in the room by the bright region of the luminous element of the luminaire.

Referring now to the drawings, embodiments of the invention are described below. FIG. 1 is a schematic sectional view of a luminaire in an embodiment for realizing the invention on the basis of the above results explained in FIG. 15 and FIG. 16.

In FIG. 1, reference numeral 1 is a light source, which is a 60 W krypton lamp. Reference numeral 2 is a reflector, 3 is a specular reflection part, 4 is a diffuse reflection part as luminous element, and 5 is a ceiling member. This luminaire is circular with a radius of 0.1 m.

The specular reflection part 3 is made of a mirror finished plastic material, and is formed in a rotary elliptical surface having a first focus on the lamp center.

The diffuse reflection part 4 is made of a aventurine finished white plastic material, and its surface is finished in a uniform diffuser for reflecting the light uniformly in all directions. Hence, the diffuse reflection part 4 is same in luminance as seen from any direction, and appears to have a uniform luminance. Therefore, the entire diffuse reflection part 4 may be regarded as a bright region.

The light radiated directly under the luminaire from the light source 1 directly illuminates the working surface. The light emitted from the light source 1 toward the specular reflection part 3 of the reflector 2 is entirely reflected toward a second focus, and finally illuminates the working surface is illuminated.

These lights illuminating the working surface are limited only in the direction of perpendicular angle of 0 to 60 degrees.

Other part of the light radiated from the light source 1 is reflected by the diffuse reflection part 4.

Since the diffuse reflection part 4 is finished in a uniform diffuser, the luminance of the diffuse reflection part 4 which is the bright region appears to be 2000 cd/m$^2$ as seen by the observer from any position in a specified area of seeing the luminaire in the direction of perpendicular angle of 60 to 90 degrees. Accordingly, the diffuse reflection part 4 satisfies the condition of formula (1-2), thereby enhancing the brightness sensation in the room.

If the diffuse reflection part 4 of the luminous element is not a uniform diffuser, the luminance of the surface may not be uniform. Generally, when seeing the region on a same plane gradually varying in the luminance like the wall surface illuminated by a spotlight, an apparent change in luminance is recognized by the human eye is only when the luminance is $\frac{1}{3}$ or less of the maximum luminance. Accordingly, in the case of the luminous element not uniform in luminance, the region having the luminance of $\frac{1}{3}$ or more of the maximum luminance is a bright region, and the luminance in the bright region is regarded same as its maximum luminance.

In the same constitution as in the luminaire in FIG. 1, using a luminaire with a radius of 0.04 m, when the reflectance is changed so that the luminance may be 4400 cd/m$^2$ when seen in a range of perpendicular angle of 60 to 90 degrees, the conditions of formulas (2) and (3) are satisfied, so that a luminaire of higher increasing effect of brightness sensation in the room is realized.

When this luminaire is installed in an office with a depth of 100 m or more and a ceiling height of 2.5 m, and the observer sees the luminaire mounted on the ceiling at a horizontal distance of 100 m, the downward vertical angle of the luminaire to the observer is about 88.4 degrees, and the solid angle of the bright region at this time is about 6.5×10$^{-9}$ sr, and the luminance is 4400 cd/m$^2$.

In the case of such small-sized luminaire, the solid angle when looking up the luminaire from immediately below (perpendicular angle 0 degree) is about 0.003 sr. As the luminance satisfying formula (1-2) is present in a range of about 2000 to 2600 cd/m$^2$, by defining the luminance of a small perpendicular angle (0 to 60 degrees) at 2300 cd/m$^2$, formula (1-2) can be satisfied at any position of the specified area if not within the room. Therefore, the room is felt bright. However, the horizontal plane illuminance is lowered.

Furthermore, by varying the reflectivity so as to be higher gradually from the upper position to the lower position of the diffuse reflection part 4, so that the luminance may be higher when seen from a longer distance (the downward vertical angle approaching 90 degrees), the range in formula (1-1) can be effectively utilized. It is, however, necessary to use a lamp of low power or dim by filter so as to lower the luminance of the light source at the same time.

Figure 16:
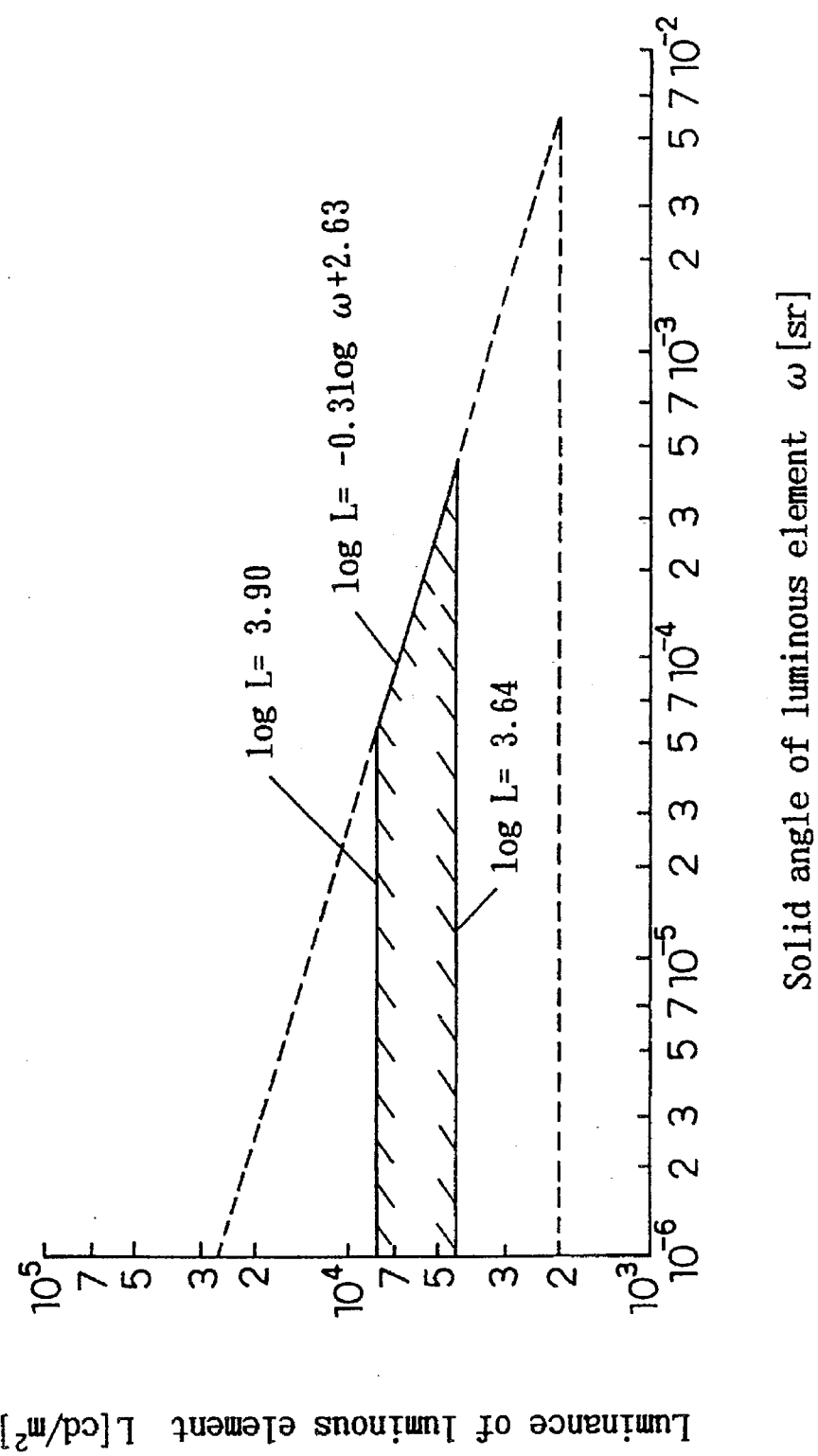
FIG. 16 shows the range of extremely high increasing effect of brightness (range of 1.3 or more of isobrightness feel illuminance ratio Er/Et).

FIG. 2 is a schematic sectional view of other embodiment for realizing the invention shown in the relation in FIG. 15 and FIG. 16.

In FIG. 2, reference numeral 6 is a light source, which is a 60 W krypton lamp same as in FIG. 1. Reference numeral 7 is a reflector, 8 is a diffusion panel, 9 is a sparkling luminous element of the diffusion panel, and 10 is a ceiling member. The entire opening of this luminaire is circular with a radius of 0.08 m, and when seen from the direction of perpendicular angle of 60 degrees, its solid angle appears to be about 1.5×10$^{-3}$ sr.

The diffusion panel 8 is a doughnut-shaped acrylic plate, and is finished so as to diffuse and transmit entirely, and the transmittance of the sparkling luminous element 9 of it is particularly high.

Accordingly, part of the light radiated from the light source 6 illuminates the working surface directly or indirectly, while other light passes through the-diffusion panel 8, and the light is diffused.

When seeing this luminaire in a range of perpendicular angle of 60 to 90 degrees, the light source 6 and reflector 7 are invisible directly, but the diffusion panel 8 and sparkling luminous element 9 are visible.

The luminance of the diffusion panel 8 is 3000 cd/m$^2$ when seen from any perpendicular angle of 60 to 90 degrees.

Moreover, the luminance of the sparkling luminous element 9 is 5000 cd/m$^2$ when seen from any perpendicular angle of 60 to 90 degrees. The diffusion panel 8 and sparkling luminous element 9 of the diffusion panel are bright regions, and they respectively satisfy the conditions in formula (1-2) and formulas (2) and (3), so that the brightness sensation in the room is further enhanced.

Figures 3A, 3B:
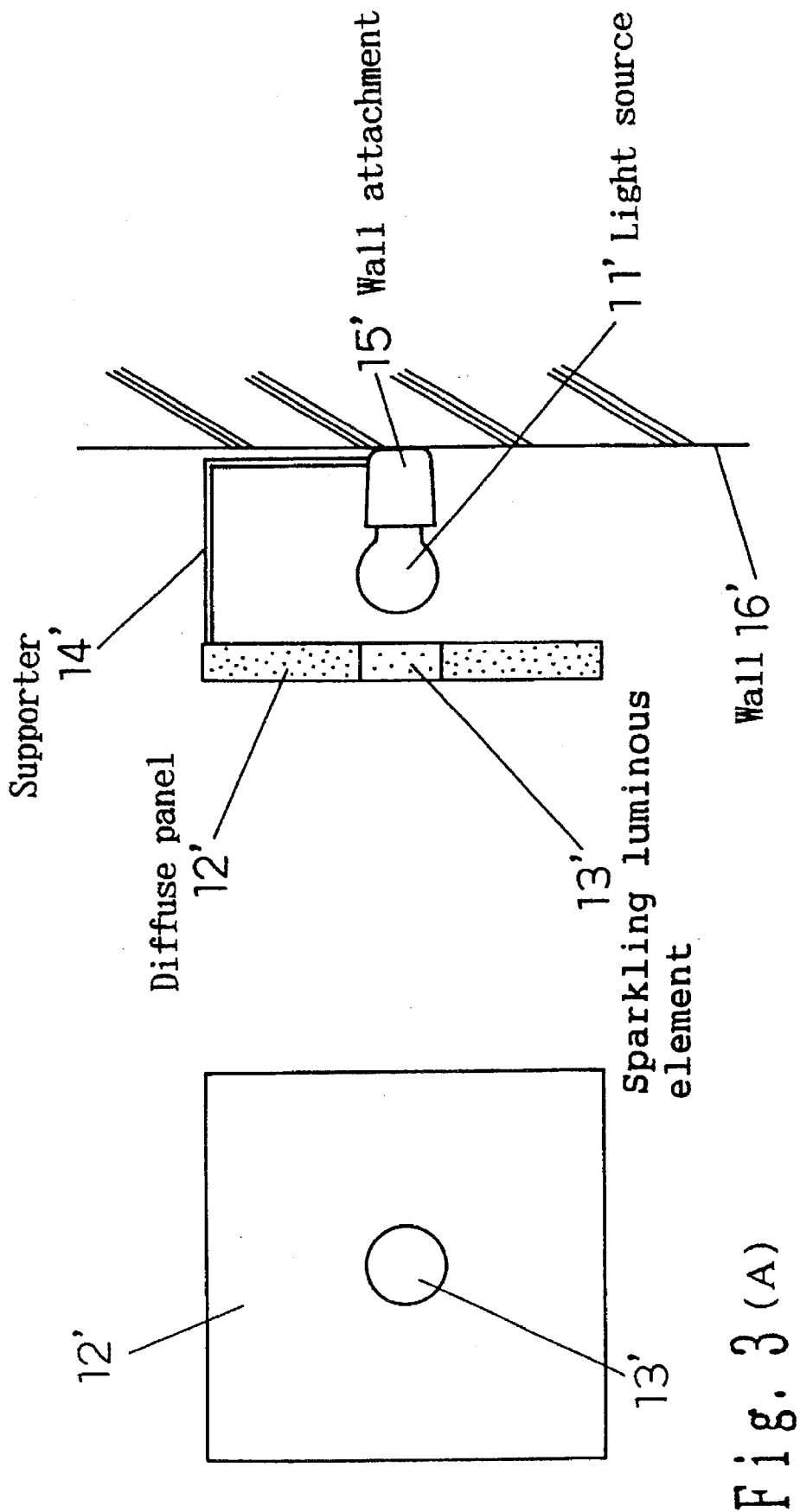
FIGS. 3(A) and 3(B) are structural drawings of an indoor luminaire in other embodiment of the invention.

FIGS. 3(A) and 3(B) are is a front view and a schematic sectional view of an embodiment of other wall bracket for realizing the invention shown in the relation in FIG. 15 and FIG. 16.

In FIGS. 3(A) and 3(B), reference numeral 11' is a light source, which is a 60 W krypton lamp. Reference numeral 12' is a diffusion panel, which is a square of 15 cm in each side. In its center, a sparkling luminous element 13' of 4 cm in diameter is provided. This diffusion panel 12' is supported by a supporter 14', and this supporter 14' is supported on a wall attachment 15' used also as the socket of the light source 11'. The wall attachment 15' is fixed to a wall 16', and wiring is connected through it.

Part of the light radiated from the light source 11' passes through the sparkling luminous element 13', and the light is transmitted and diffused. At this time, the luminance of the diffusion panel 12' is 50 to 60 cd/m$^2$. Other part of the light radiated from the light source 11' is released in the lateral direction from the light source, and illuminates the room.

The condition of the sparkling luminous element 13' which is the bright region is seen from a distance of about 1.45 m or more satisfies the condition of formula (1-2). The diffusion panel 12' in the background of the bright region also assists the increasing effect of brightness, so that the brightness sensation in the room is enhanced, Supposing the luminance Of the bright luminous element 13' to be 5000 cd/m$^2$, its conditions satisfies the formulas (2) and (3), and hence the brightness sensation is further heightened.

FIGS. 4(A) and 4(B) are is a schematic sectional views of a luminaire showing a different embodiment for realizing the invention shown in the relation in FIG. 15 and FIG. 16.

In FIGS. 4(A) and 4(B), reference numeral 11 is a light source, which is a 18 W compact fluorescent lamp. Reference numeral 12 is a main body, having a square section, and the inner dimension of its one side is 18 cm.

A reflector 13 is provided in the main body 12. A louver 14 is square with the outer dimension of one side of 18 cm, and is partitioned into nine small squares with one side of 6 cm.

The inner center square of the nine squares is a sparkling reflector 15; luminous element, and its inner surface has diffusion and reflection treatment such as white mat painting.

The eight peripheral squares surrounding the sparkling reflector 15 are background reflectors 16; background luminous elements, and the inner surface of all is treated with aluminum evaporation painting, and it is designed so that the light may not diffuse sideways. Reference numeral 17 is a ceiling member.

The light directly radiated from the light source 11 into the under direction of the luminaire, and the light from the light source 11 reflected by the reflector 13 and released in the under direction of the luminaire illuminate the working surface.

The light directly radiated from the light source 11 toward the sparkling reflector 15 of the louver 14, and the light from the light source 11 reflected by the reflector 13 and radiated toward the sparkling reflector 15 are diffused and reflected on the sparkling reflector 15 having diffusion and reflection treatment, and when the observer sees from any direction of the downward vertical angle of 60 to 90 degrees, the luminance of the sparkling reflector appears to be 2000 cd/m$^2$. At this time, as the sparkling reflector 15 is uniform in luminance distribution, its entire surface is regarded as a bright region.

Other part of the light radiated from the light source 11 is reflected by the background reflector 16. Since the background reflector 16 has specular reflection treatment, its luminance appears to be 50 cd/m$^2$ or less when seen from any direction of the downward vertical angle of 60 to 90 degrees of the luminaire. At this time, the background reflector 16 is regarded as a background luminous element. Hence, it increases the brightness sensation in the room.

Incidentally, when the surface treatment of the sparkling reflector 15 is changed from the intense diffusion and reflection of white painting to surface treatment of slightly high directionality, the luminance becomes 5000 cd/m$^2$ when seen from any direction in the downward vertical angle of 60 to 90 degrees, and the luminous element looks sparkling, and the brightness sensation in the room is further enhanced.

In this embodiment, the luminance of the luminaire is constant as seen from any direction, but if the distribution of luminous intensity of the luminaire varies in the luminance depending on the viewing direction within the range satisfying formula (1-2) or formulas (2) and (3), the luminaire is able to increase the brightness sensation in the room.

Or, as mentioned above, when the background of the luminous element has a luminance over 100 cd/m$^2$, the effect of the luminous element of the luminaire for increasing the brightness sensation in the room is smaller. But in this luminaire, since the background reflector 16 as the background luminous element of the sparkling reflector 15 as the bright region is always kept at low luminance, this luminaire can increase the brightness sensation in the room is increased securely, even if this luminaire is mounted on the ceiling of high luminance exceeding 100 cd/m$^2$.

For example, in an office with a depth of 100 m or more and a ceiling height of 2.5 m, when the observer sees the luminaire mounted on the ceiling at a horizontal distance of 100 m, the downward vertical angle of the luminaire to the observer is about 88.4 degrees, and the solid angle of the lattice of the central reflector sparkling at this time is about $1.0 \times 10^{-8}$ sr, and the luminance is 5000 cd/m$^2$.

Herein, the square luminaire using fluorescent lamps is presented as the embodiment, but as far as the luminous element and its surrounding background are present, the relation between the luminanceand apparent size of the bright region of the luminous element satisfies formula (1-2) or formulas (2) and (3), and the background luminance is 100 cd/m$^2$ or less, any lamp may be used such as halogen lamp, incandescent lamp, HID lamp, other small-sized high luminance lamps, LED, and EL, and the shape of the luminaire is free, not limited to square.

In the embodiment, the center of the lattice-shaped louver is the sparkling reflector, but it is not always needed to use the center as the sparkling luminous element, but the lattice at any position may be used as the sparkling reflector.

Besides, not limited to one lattice, plural lattices may be used as sparkling reflectors.

FIGS. 5(A)–5(C) are is a schematic sectional views of other embodiment for realizing the invention shown in the relation in FIGS. 15 and FIG. 16.

In FIG. 5(A)–5(C), reference numeral 18 is a light source, which is a 27 W compact fluorescent lamp.

Reference numeral 19 is a main body, which is a square shape as seen from immediately beneath, and the inner dimension of its one side is 300 mm. A reflector 20 is provided inside the main body 19.

A louver 21 is square with one side measuring 300 mm in outer dimension, and is partitioned into 25 square lattices of about 60 mm on one side by a louver member 22.

The louver member 22 is composed of a light inlet 23, a light guide 24, and a front end 25 as luminous element in the inside, and the surface is composed of a reflector 26 as a background luminous element. Reference numeral 27 is a ceiling member.

The light radiated from the light source 18 is reflected and absorbed repeatedly inside the luminaire, and part thereof is put inside from the light inlet 23 of the louver member 22, and passes through the light guide 24, and is diffused at the front end 25.

At this time, the luminance of the front end 25 is designed to be about 5000 cd/m$^2$ as seen from any direction of the downward vertical angle of 60 to 90 degrees.

The front end 25 of the louver member 22 is a slender rectangle of 5 mm in width and about 300 mm in length, and its area is about 0.0015 m$^2$, and therefore when the luminaire using this louver is installed in a room with a ceiling height of 2.5 m, and the luminaire is seen from the direction of perpendicular angle of 60 degrees, the apparent solid angle of the front end 25 is about $1.1 \times 10^{-4}$ sr.

The relation of the luminance and solid angle of the front end 25 conforms to the range of formulas (2) and (3), and hence the front end 25 appears to be sparkling, thereby increasing the brightness sensation in the room.

If the luminance of the front end 25 is about 2000 to 4400 cd/m², the entire front end 25 is a bright region, and the relation of its luminance and solid angle satisfies the condition of formula (1-2), and the brightness sensation in the room is enhanced.

Herein, other part of the light radiated from the light source 18 is reflected by the reflector 26 on the surface of the louver member 22, and this reflector 26 has a unique surface curvature and a unique specular reflection property, and it reflects much light in the under direction, but is suppressed in the light reflection in the lateral direction, and when the reflector 26 is seen from any direction of the downward vertical angle of 60 to 90 degrees, its luminance is 100 cd/m² or less. At this time, the reflector 26 is a background luminance of the bright region.

In this embodiment, a 27 W compact fluorescent lamp is used as the light source 18, However, in order to enhance the effect of increasing the brightness sensation, it is necessary to raise the luminance of the front end 25 to a high level of 5000 cd/m². Therefore, a fluorescent lamp of smaller size and higher output can be used, or other lamp such as halogen lamp, incandescent lamp and HID lamp can be used.

Incidentally, the shape and size of the louver and luminaire are not particularly specified.

FIG. 6 is a schematic sectional view of a further different embodiment for realizing the invention shown in the relation in FIG. 15 and FIG. 16.

In FIG. 6, reference numeral 28 is a light source, which is a 60 W krypton lamp.

Reference numeral 29 is a reflector, 30 is a main body, 31 is an opening, and 32 is a reflection object as a luminous element, which is supported at a specified place near the light source, (for example a lowest edge of the main body 30), by a wire 32a or the like. Reference numeral 33 is a ceiling member.

The light radiated from the light source 28 is reflected and absorbed repeatedly by the reflector 29 provided in the main body 30 of the luminaire and others, and is finally released beneath the luminaire from the opening 31 of the luminaire.

The majority of the light released from the opening 31 is used as the light for illumination of the room, but part of the remaining is reflected by the reflection object 32.

The reflection object 32 is in a imitative conical form, having the ridge curved in a concave form, measuring 5 cm in diameter of bottom and 5 cm in height, and the reflectivity of the reflection object 32 and the ridge curvature are designed so that the reflection object may be a bright region and the luminance may be seen always about 2000 to 5000 cd/m² when the reflection object 32 is seen from a direction of perpendicular angle of 60 to 90 degrees. When the luminance of the reflection object 32, which is the bright region, is 2000 cd/m², the condition of formula (1-2) is satisfied, and the brightness sensation increases. When 5000 cd/m², moreover, the condition of formulas (2) and (3) is satisfied, and the brightness sensation is further enhanced.

At this time, when the reflection object 32 is supported by the linear body 32a at a position lowered about 2.8 cm immediately from the center of the opening 31, as the reflection object 32 is seen from a direction of perpendicular angle of 60 to 90 degrees, the reflector 29 is always seen in the background according to the specified configuration. Hence, by finishing the reflector 29 as the background luminous element of the reflection object 32 in the bright region in specular reflection status to lower the luminance in the direction in the downward vertical angle range of 60 to 90 degrees to 100 cd/m² or less, wherever this luminaire may be installed, the brightness sensation can be enhanced without effect of the ambient lighting.

The shape and size of the reflection object 32 are not particularly specified as far as the relation of its luminance and size satisfies the condition of either formula (1-2) or formulas (2) and (3).

On the other hand, as the light source 28, herein, a 60 W krypton lamp is used, but the light source is not particularly limited.

There is no limiting condition for the shape and size of the opening 31.

Besides, by installing the reflection object 32 alone in the existing luminaire, too, the effect of enhancing the brightness sensation in the room is also obtained.

However, when the luminance of the reflector 29 seen through the opening 31 is high or when room accommodating the luminaire is bright and the background luminance is too high, the effect of enhancing the brightness sensation in the room is lessened.

Instead of the reflection object 32, a light permeable object may be installed when the relation of its luminance and solid angle is in the range of formula (1-2) or formulas (2) and (3).

FIGS. 7(A) and 7(B) are is a schematic sectional views of other embodiment for realizing the invention shown in the relation in FIG. 15 and FIG. 16.

In FIGS. 7(A) and 7(B), reference numeral 34 is a light source, which is a 60 W krypton lamp. Reference numeral 35 is a reflector, 36 is a main body, 37 is an optical fiber, 38 is a light inlet, 39 is a front end, 40 is a light diffusion area as luminous element, 41 is a glare-less reflection area, 42 is an opening, and 43 is a ceiling member. The light diffusion area 40 is cylindrical with diameter of 1 cm.

The light radiated from the light source 34 is reflected and absorbed repeatedly by the reflector 35 provided in the main body 36 of the luminaire, and is finally released immediately beneath the luminaire from the opening 42 of the luminaire, and the majority of the light released from the opening 42 is used as the light for illuminating the room.

On the other hand, part of the light radiated from the light source 34 is directly put into the light inlet 38 of the optical fiber 37, and runs through the optical fiber 37, and is guided into the front end 39, from which it is radiated.

The light radiated from the front end 39 is diffused in the light diffusion area 40. The luminance of the light diffusion area 40 is designed to be always seen around 5000 cd/m² when the light diffusion area 40 is seen from the direction of perpendicular angle of 60 to 90 degrees.

Consequently, the light diffusion area 40 becomes a bright region, and hence the brightness sensation in the room is increased.

The luminance and size of the light diffusion area 40 are not particularly defined as far as their relation conforms to the range of formula (1-1) or formulas (2) and (3).

As the light source 34, a 60 W krypton lamp is used herein, but the type of light source is not particularly limited.

Besides, there is no limiting condition for the shape and size of the opening 42.

FIGS. 8(A) and 8(B) are schematic sectional views showing a different embodiment for realizing the invention shown in the relation in FIG. 15 and FIG. 16.

In FIGS. 8(A) and 8(B), reference numeral 44 is a light source, which is a 36 W compact fluorescent lamp.

Reference numeral 45 is a main body, which has a rectangular section with the width of 300 mm and length of 450 mm. A reflector 46 is provided inside the main body 45.

Reference numeral 47 is a louver, 48 is a sparkling light source, 49 is a sparkling luminous element, and 50 is a ceiling member. The main body 45, reflector 46, and louver 47 of this luminaire are same as in the conventional luminaire, and what is different is that a plurality of sparkling light sources 48 are disposed so as to surround the outer circumference of the implement, aside from the light source 44, on the side surface of the main body 45.

The light radiated from the sparkling light source 48 passes through the sparkling luminous element 49.

The sparkling luminous element 49 has a square shape of 30 mm each, and its luminance appears to be 10000 cd/m² when the sparkling luminous element 49 is seen from any direction of the downward vertical angle of 60 to 90 degrees. In this case, the sparkling luminous element 49 is a bright region.

For example, when this luminaire is installed in a room with a ceiling height of 2.5 m and it is seen from a direction of perpendicular angle of 60 degrees, since the solid angle of the sparkling luminous element 49 which is the bright region is $1.15 \times 10^{-4}$ sr, it is in the range of increasing brightness sensation in the room in FIG. 15 defined by formula (1-1).

When it is seen from a direction of perpendicular angle of 85 degrees (corresponding to a distance of 14.9 m), since the solid angle is $4.0 \times 10^{-6}$ sr, it is also in the range of increasing brightness sensation in the room in FIG. 15 defined by formula (1-1).

In this embodiment, the sparkling luminous element 49 is provided in the side surface of the main body 45 of the luminaire, but it may be also buried, for example, in the louver 47 or installed at any position of the main body 45 of the luminaire, as far as the relation of the luminance and solid angle of the bright region may be in the range in FIG. 15 or FIG. 16. If the sparkling luminous element 49 is concealed by the main body 45 or the like, the increasing effect of brightness sensation is lost, and in this embodiment the sparkling luminous element 49 is disposed around the outer circumference of the main body 45 so as to be seen from any direction.

In this embodiment, moreover, the luminance of the luminaire is constant, but as far as it is within the range satisfying formula (1-2) or formulas (2) and (3), if the luminance is not uniform in the light distribution, the luminaire increased in the brightness sensation in the room is realized.

Furthermore, by installing a light source for bright luminous element aside from the light source of the main body of the luminaire, as in this embodiment, the following advantages are brought about.

When this luminaire is installed in an office room in which plural people are working, while many people are working, of course, the light source of the main body of the luminaire for illuminating the room is lit. When people are not present in a certain range and the illumination for the working surface for the task is not needed, by lighting the light source for bright luminous element, the brightness sensation in the room can be maintained even if the illumination of the main body of the luminaire in the range is put out.

As a result, the lighting energy can be saved without feeling gloomy in the room. In particular, in the case of lighting system with an illuminance sensor, by sensing the illuminance level in the room, when the room illuminance is maintained by daylight, while turning on the light source of the sparkling luminous element, the light source of the main body of the luminaire may be dimmed or put out by a dimmer circuit Besides, the sparkling luminous element of which relation of luminance and solid angle is in the range of formula (1-2) or formulas (2) and (3) may be independently installed on the ceiling or wall, without attaching to the main body of the luminaire, so that it can be applied in an existing lighting installation.

Or, by attaching an illuminance sensor to an independent sparkling luminous element, a system for lighting up the light source of the sparkling luminous element when the room illuminance is lowered and it is felt dark can be designed.

Incidentally, when a battery abundant in the storage capacity is incorporated as the power source for the light source of the sparkling luminous element, it may be easily installed in an existing lighting installation without wiring works.

Thus, according to the invention, supposing the luminance of the sparkling region of the luminous element to be L [unit: cd/m²] and the apparent size of the sparkling region to be solid angle w [unit: steradian (st)], by having one or more sparkling regions of which luminance L is in a range of $3.3 \leq \log L \leq -0.3 \log w + 2.63$, it is effective to give an active atmosphere without giving glare directly to office workers, giving dark feel of the ceiling or blocking the visual field substantially, and by giving a desired illuminance on the working surface and giving a brightness sensation in the entire room.

Furthermore, by having one or more sparkling regions in a range of $3.48 \leq \log L \leq -0.3 \log w + 2.63$, and $3.64 \leq \log L \leq 3.90$, in addition to the above effects, the sparkling of the light source is obtained, and the entire room is felt more bright.

Furthermore when there are many luminous elements on the ceiling in a large room, it is preferable that said specified area is an area over a specific angle and under a specific angle on the basis of the perpendicular direction since too many bright regions are discomfort for human eyes bright region is not necessary. For realizing such conditions for example in FIGS. 4(A) and 4(B) the sparkling reflector 15 is made not to diffuse the light, or is made with having a curve surface.

What is claimed is:

1. A luminaire for interior lighting comprising:

a first luminous element having at least one bright region with a luminance L (unit: cd/m²), wherein:

the at least one bright region of the first luminous element is visible at any position in a specified area of a room, and a relation of the luminance L of the first luminous element and a solid angle w satisfies one of $$3.3 \leq \log L \leq -0.3 \log w + 2.63$$

and $$\log L \leq -0.3 \log w + 2.63,$$

where $$3.64 \leq \log L \leq 3.90,$$

the solid angle w (unit: steradian (sr))being an apparent size of the bright region, whereby the specified area is based on the first luminous element in the room.

2. A luminaire for interior lighting comprising:

a first luminous element having at least one bright region with a luminance L (unit: cd/m²), wherein:

the at least one bright region of the first luminous element is visible at any position in a specified area, and a relation of the luminance L of the first luminous element and a solid angle w satisfies one of $$3.3 \leq \log L \leq -0.3 \log w + 2.63$$

and $$\log L \leq -0.3 \log w + 2.63,$$

where $3.64 \leq \log \leq 3.90$, the solid angle w (unit: steradian (sr))being an apparent size of the bright region, whereby the specified area is based on the first luminous element of the luminaire.

3. A luminaire for interior lighting of claim 1, wherein the specified area is an area over a specific angle and under another specific angle on the basis of a perpendicular direction from one of an end and a center of the first luminous element.

4. A luminaire for interior lighting of claim 3, wherein the specified area is an area over a 60 degree angle and under an 80 degree angle on the basis of the perpendicular direction.

5. A luminaire for interior lighting of claim 1, wherein the specified area is an area over a specific distance from a center of the first luminous element.

6. A luminaire for interior lighting of claim 2, wherein the specified area is an area over a specific distance from a center of the first luminous element.

7. A luminaire for interior lighting of claim 1, further comprising:

a second luminous element provided near the first luminous element.

8. A luminaire for interior lighting of claim 2, further comprising:

a second luninous element provided near the first luminous element.

9. A luminaire for interior lighting of claim 7, further comprising:

a light source for radiating a light, and a louver member, the louver member having:

a front end for guiding a part of the light radiated from the light source into the louver member and diffusing the guided light thereby, forming the first luminous element, and a reflector for reflecting other part of the light radiated from the light source, thereby forming the second luminous element.

10. A luminaire for interior lighting of claim 7, further comprising:

a light source for radiating light, and a lattice shaped louver member formed of plate members for reflecting the light of the light source, wherein at least one plate member of the lattice shaped louver member reflects the light from the light source to form the first luminous element, and other plate members reflect the light from the light source to form the second luminous element.

11. A luminaire for interior lighting of claim 8, further comprising:

a light source for radiating a light, and a louver member, the louver member having:

a front end for guiding a part of the light radiated from the light source into the louver member and diffusing the guided light, thereby forming the first luminous element, and a reflector for reflecting other part of the light radiated from the light source, thereby forming the second luminous element.

12. A luminaire for interior lighting of claim 8, further comprising:

a light source for radiating light, and a lattice shaped louver member formed of plate members for reflecting the light of the light source, wherein at least one plate member of the lattice shaped louver member reflects the light from the light source to form the first luminous element, and other plate members reflect the light from the light source to form the second luminous element.

13. A luminaire for interior lighting of claim 1, further comprising:

a light source for radiating light, and one of a reflection object for reflecting a part of the light radiated from the light source and a transmission object for transmitting a part of the light, such objects being supported at a specified place near the light source, wherein the one of the reflection object and the transmission object is the first luminous element.

14. A luminaire for interior lighting of claim 1, further comprising:

a luminaire main body buried in a ceiling, a light source coupled to the luminaire main body for radiating light, at least an optical fiber for leading out part of the light radiated from the light source, and a light diffusion part attached to a front end of the optical fiber for diffusing the led out light to the ceiling near the main body of the luminaire, wherein the light diffusion part is the first luminous element.

15. A luminaire for interior lighting of claim 1, further comprising:

a first light source for general illumination, and a second light source for use by the first luminous element, wherein the first luminous element is prevented from using the first light. source.

16. A luminaire for interior lighting of claim 2, further comprising:

light source for radiating light, and one of a reflection object for reflecting a part of the light radiated from the light source and a transmission object for transmitting a part of the light, such objects being supported at a specified place near the light source, wherein the one of the reflection object and the transmission object is the first luminous element.

17. A luminaire for interior lighting of claim 2, further comprising:

a luminaire main body buried in a ceiling, a light source coupled to the luminaire main body for radiating light, at least an optical fiber for leading out part of the light radiated from the light source, and a light diffusion part attached to a front end of the optical fiber for diffusing the led out light to the ceiling near the main body of the luminaire, wherein the light diffusion part is the first luminous element.

18. A luminaire for interior lighting of claim 2, further comprising:

a first light source for general illumination, and a second light source for use by the first luminous element, wherein the first luminous element is prevented from using the first light source.

* * * * *